United States Patent [19]
Mori

[11] Patent Number: 5,878,079
[45] Date of Patent: Mar. 2, 1999

[54] DATA RECEPTION CONTROL DEVICE

[75] Inventor: Toshihiro Mori, Osaka, Japan

[73] Assignee: Mita Industrial Co., Ltd., Osaka-fu, Japan

[21] Appl. No.: 790,135

[22] Filed: Jan. 29, 1997

Related U.S. Application Data

[62] Division of Ser. No. 440,591, May 15, 1995, Pat. No. 5,657,347.

[30] Foreign Application Priority Data

May 27, 1994 [JP] Japan ................................. 6-115565

[51] Int. Cl.$^6$ .............................. H04B 3/46; H04B 17/00
[52] U.S. Cl. ......................... 375/225; 375/355; 375/369
[58] Field of Search .................................... 375/225, 222, 375/355, 360, 369, 370, 377; 370/465

[56] References Cited

U.S. PATENT DOCUMENTS 5,657,347   8/1997   Mori ........................................ 375/225

*Primary Examiner*—Stephen Chin
*Assistant Examiner*—Bryan Webster
*Attorney, Agent, or Firm*—Jordan and Hamburg

[57] ABSTRACT

A data reception control device for receiving a group of commands transmitted by a start-stop transmission method including a first type of commands of which data transmission rates are detectable and a second type of commands of which data transmission rates are undetectable. The data reception control device includes a data transmission rate determinator for determining a data transmission rate from the start bit length of the first character of a received command; a clock generator for generating a sampling clock for data bit synchronization in accordance with the data transmission rate obtained; a data receptor for receiving character data of the command based on the sampling clock; a data element analyzier for analyzing data elements of the received command; a judgment device for judging whether a next command is of a type having the same data transmission rate as the preceding command based on results of data element analysis; and a data reception controller for controlling the data receptor in such a manner that character data of the next command is received by using a sampling clock corresponding to the data transmission rate of the preceding command if the judgment device judges that the next command is of a type having the same data transmission rate as the preceding command.

5 Claims, 18 Drawing Sheets

FIG. 7

| DATA FORMAT | 8-BIT DATA STRUCTURE READ OUT BY RECEIVED DATA FORMAT | | | |
|---|---|---|---|---|
| | CHARACTER "A" | | CHARACTER "T" | |
| F1 | 1 0 0 0 (1H) | 0 0 1 0 (4H) | 0 0 1 0 (4H) | 1 0 1 1 (DH) |
| F2 | 1 0 0 0 (1H) | 0 0 1 1 (CH) | 0 0 1 0 (4H) | 1 0 1 0 (5H) |
| F3 | 1 0 0 0 (1H) | 0 0 1 0 (4H) | 0 0 1 0 (4H) | 1 0 1 0 (5H) |
| F4 | 1 0 0 0 (1H) | 0 0 1 1 (CH) | 0 0 1 0 (4H) | 1 0 1 1 (DH) |

FIG. 10

| STEP NO. | DATA COMMUNICATIONS | | |
|---|---|---|---|
| | PERSONAL COMPUTER PC | DIRECTION | FACSIMILE MACHINE 1 |
| 1 | ATEO | →<br>← | OK |
| 2 | AT&D2 | →<br>← | OK |
| 3 | ATM1 | →<br>← | OK |
| 4 | AT + FCLASS = 1 | →<br>← | OK |
| 5 | AT + FTM = ? | →<br>←<br>← | 72 , 96<br>OK |
| 6 | AT + FTH = 3 | →<br>← | CONNECT |
| 7 | PROCEDURAL SIGNAL DCS | →<br>← | OK |
| 8 | AT + FTM = 96 | →<br>← | CONNECT |
| 9 | TRAINING SIGNAL TCF | →<br>← | OK |
| 10 | AT + FRH = 3 | →<br>← | OK |
| 11 | AT + FCLASS = 0 | →<br>← | OK |
| 12 | ATEO | →<br>← | OK |
| 13 | AT | →<br>← | OK |

DATA RECEPTION CONTROL DEVICE

This is a division of application Ser. No. 08/440,591, filed May 15, 1995, U.S. Pat. No. 5,657,347.

BACKGROUND OF THE INVENTION

This invention relates to a data reception control device which determines the transmission rate of received data and generates a sampling clock corresponding to the transmission rate for properly receiving the data.

A facsimile modulator/demodulator (hereinafter referred to as FAX modem) is commercially available in recent years that can transmit data from a personal computer to a remote facsimile machine via a telephone line. By connecting the personal computer to the telephone line, the FAX modem adds a capability of facsimile transmission and reception to conventional personal computer communications (hereinafter referred to as PC communications).

The FAX modem is usually Provided with an AT command receiver so that its operation is controlled by AT commands. The AT command system uses a set of commands each starting with a combination of characters "AT". Upon receiving the characters "A" and "T" the FAX modem checks data transmission rate and format. A character string following the characters "A" and "T" to constitute a command is then received at the correct data transmission rate and format.

The AT command system includes facsimile-related commands, by which it is possible to select Class 1 communications mode in accordance with Recommendation 578 as stipulated by the Electronic Industries Association (known as EIA) of the United States.

In Class 1 communications mode, transmitting and receiving terminals exchanges not only AT commands but also non-AT commands consisting of characters starting with other than "AT" in accordance with a specific protocol. Therefore. the receiving terminal usually comprises an AT command receiving circuit for receiving AT commands as well as a general-purpose receiving circuit for receiving non-AT commands, and these receiving circuits needs to be switched depending on the type of commands sent from the data transmitting terminal. This construction tends to make receiving circuitry rather complicated.

In a process of data communications in Class 1 communications mode using AT commands, however, non-AT commands are preceded by a predetermined AT command and yet the non-AT commands are transmitted at the same transmission rate as the AT command. Accordingly, provided that the transmission rate of the preceding AT command is determined (regardless of whether the transmission rate of the non-AT commands is determined), the AT command receiving circuit can properly receive the non-AT commands based on the AT command transmission rate.

SUMMARY OF THE INVENTION

It is an object of the present invention to provide a data reception control device which has overcome the problems residing in the prior art.

It is an object of the present invention to provide a data reception control device which has a simple circuit construction and which can receive a group of commands transmitted by a start-stop transmission method including a first type of commands of which data transmission rates are detectable as well as a second type of commands of which data transmission rates are undetectable.

A data reception control device of the invention comprises data transmission rate determination means for determining a data transmission rate from the start bit length of the first character of a received command; clock generation means for generating a sampling clock for data bit synchronization in accordance with the data transmission, rate obtained; data reception means for receiving character data of the command based on the sampling clock; data element analyzing means for analyzing data elements of the received command; judgment means for judging whether a next command is of a type having the same data transmission rate as the preceding command based on results of data element analysis; and data reception control means for controlling the data reception means in such a manner that character data of the next command is received by using a sampling clock corresponding to the data transmission rate of the preceding command if the judgment means judges that the next command is of a type having the same data transmission rate as the preceding command.

It may be appreciated that the data transmission rate determination means determines the data transmission rate of the received command from a plurality of preset data transmission rates and outputs a select signal for specifying the data transmission rate obtained, and the clock generation means is constructed in such a manner that it simultaneously generates sampling clocks of a plurality of predefined frequencies corresponding to the preset data transmission rates by dividing a reference clock and selectively outputs a sampling clock of a specific frequency based on the select signal fed from the data transmission rate determination means.

Also, it may be appreciated that the data reception control means inhibits data transmission rate determination operation of the data transmission rate determination means when receiving the next command if the judgment means judges that the next command is of a type having the same data transmission rate as the preceding command, and holds the select signal outputted from the data reception control means until reception of the next command is completed.

The data reception control device may be used for receiving a group of AT commands.

With the data reception control device, when it is judged based on data elements of received command that a next command is of a type having the same data transmission rate as the preceding command, data reception is controlled in such a manner that the next command is received by using a sampling clock corresponding to the data transmission rate of the preceding command. This will eliminate the necessity of providing a special reception device to receive command whose transmission rate is undetectable, and thus make it possible to receive a group of commands including both transmission-rate-detectable commands and transmission-rate-undetectable commands in a simplified construction.

Also, sampling clocks of a plurality of predefined frequencies are simultaneously generated. A corresponding sampling clock is selectively outputted in accordance with a detected transmission rate. Accordingly, an optimum sampling clock can be provided.

Further, if a next command is judged to be of the type having the same data transmission rate as the preceding command, the select signal for the preceding command is held until the reception of the next command is completed so that the next command is received in accordance with the sampling clock for the preceding command. This will simplify the changing of sampling clocks.

These and other objects, features and advantages of the present invention will become more apparent upon a reading of the following detailed description of preferred embodiments, which are illustrated in drawings.

BRIEF DESCRIPTION OF THE DRAWINGS

FIG. 7 is a diagram showing bit structures and coded representations of character data received in accordance with the received data format;

FIG. 10 is a diagram showing an example of a data exchange procedure in Class 1 communications mode using AT commands;

DETAILED DESCRIPTION OF THE PREFERRED EMBODIMENTS OF THE INVENTION

Figure 1:
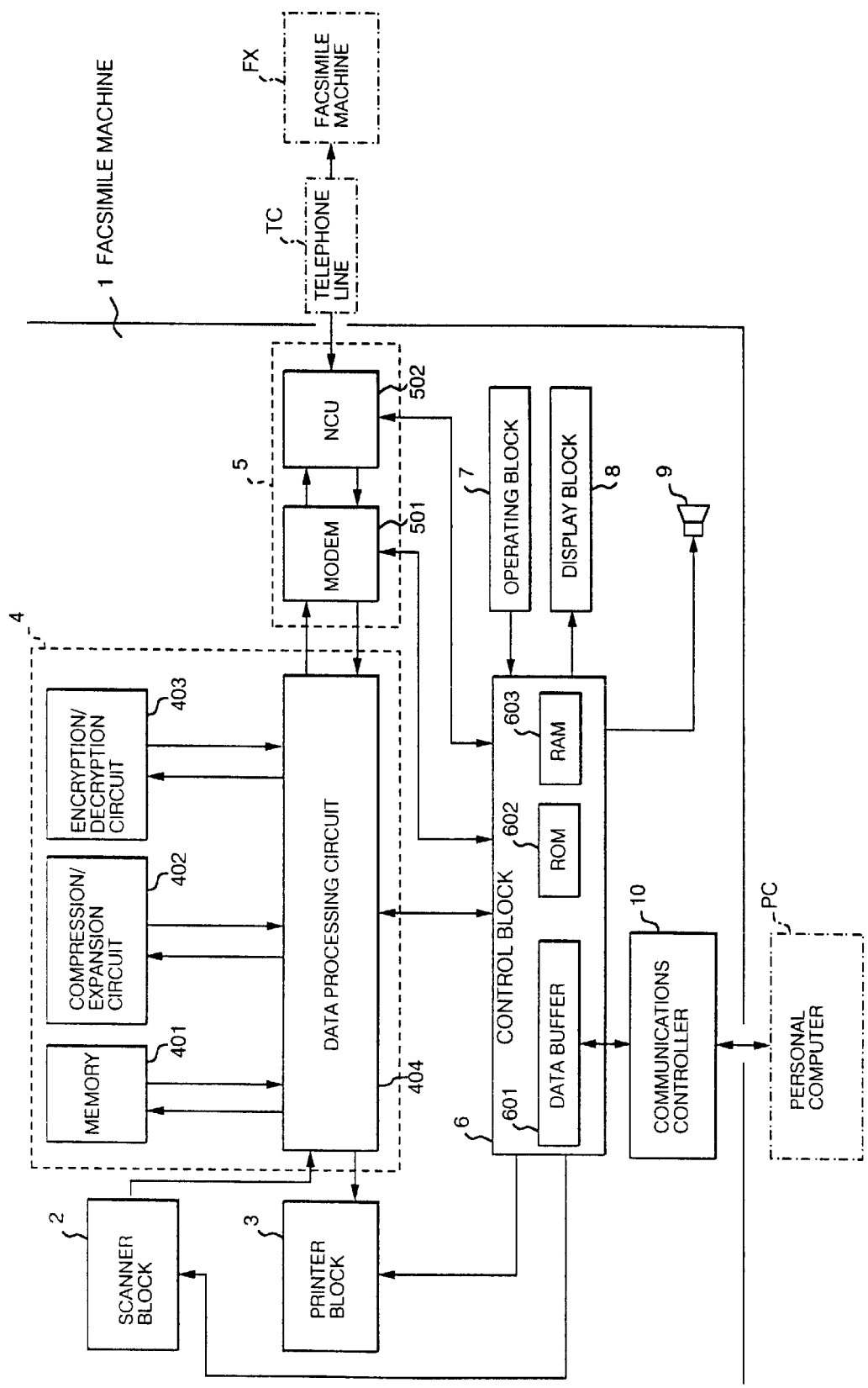
FIG. 1 is a block diagram of a facsimile machine provided with a data reception control device according to the invention.

FIG. 1 is a block diagram of a facsimile machine 1 provided with a data reception control device according to the invention.

The facsimile machine 1 is a G3-type facsimile machine constructed to enable high-speed transmission and reception of encrypted data. The facsimile machine 1 has, in addition to the ordinary facsimile function, a capability to perform PC communications. For this purpose, the facsimile machine 1 is made externally connectable to a personal computer PC, which gives commands necessary for performing communications operations. It is to be noted that the facsimile machine 1 need not necessarily be of G3 type, but may be of G4 or any other type conforming to industry standards.

The facsimile machine 1 comprises a scanner block 2 for reading an original image to be transmitted to another facsimile machine FX, a printer block 3 for printing image data read by the scanner block 2, image data received from the facsimile machine FX or data sent from the personal computer PC on printing paper, a data processing block 4 for processing outgoing and incoming image data as well as PC communications data, a data transfer block 5 for transmitting and receiving the data via a telephone line TC, and a control block 6 for controlling the scanner block 2, printer block 3, data processing block 4 and data transfer block 5.

The control block 6 is associated with a communications controller 10 containing an RS-232C interface for connecting the personal computer PC to the facsimile machine 1 to allow communications between them. Although the present embodiment is described as employing the RS-232C interface, the type of the interface is not limited thereto as long as it allows communications between the facsimile machine 1 and personal computer PC.

The control block 6 comprises a data buffer 601 for temporary storage of data received from the personal computer PC, a read-only memory (hereinafter referred to as ROM) 602 which stores a processing program required for executing facsimile and PC communications functions and various kinds of data to be used for controlling light source intensity of the scanner block 2 and developing density and other operating conditions of the printer block 3 as well as for presentation of warnings and operating guidance messages, for instance, and a random access memory (hereinafter referred to as RAM) 603 which performs mathematical operations as prescribed in the processing program.

The ROM 602 also stores a communications program which enables analysis of AT commands so that the facsimile machine 1 can be controlled by a set of AT commands entered from the personal computer PC.

The facsimile machine 1 further comprises an operating block 7 including numeric keys and one-touch keys, a display block 8 including a liquid crystal display (hereinafter referred to as LCD) or light-emitting diodes (hereinafter referred to as LED's), and a speaker 9.

The scanner block 2 contains an automatic document feeder for transporting a loaded original document, an image pickup unit including a charge-coupled device (hereinafter referred to as CCD) line image sensor, and an image processing unit. The image pickup unit scans the original document line by line as it is transported by the automatic document feeder. Image data read from the original document is subjected to image processing including level compensation, gamma correction and analog-to-digital conversion, and delivered to the data processing block 4.

The printer block 3 is built to constitute a laser printer comprising a light projecting unit which emits a laser beam produced by converting a modulating signal derived from pixel data of an image to be printed (hereinafter referred to as a print image), a photosensitive unit which produces a latent image when subjected to the laser beam emitted by the light projecting unit, a developing unit which develops the latent image formed on the photosensitive unit to create a visible print image, an image transfer unit which transfers the visible print image onto paper, and a fixing unit which fixes the transferred print image on the paper.

The data processing block 4 comprises a memory 401 for storing outgoing and incoming data, a compression/expansion circuit 402 for compressing and expanding data, an encryption/decryption circuit 403 for encrypting outgoing data and for decrypting incoming data, and a data processing circuit 404 for controlling data compression/expansion and encryption/decryption processes.

The memory 401 is a large-capacity memory device that can store images of about 100 pages of A4-size standard documents. This memory enables various operations such as memory-direct reception for delayed output, reception of a confidential message as well as scheduled transmissions. The compression/expansion circuit 402 compresses outgoing data and expands incoming data according to data compression methods as defined in Recommendation T.4 of the International Telecommunications Union (known as ITU).

The encryption/decryption circuit 403 performs data encrypting and decrypting operations by using predefined cipher keys.

The data processing circuit 404 applies prescribed data processing treatment to outgoing data, incoming data or communications data in accordance with control signals fed from the control block 6, and then transfers the data or print it out on printing paper.

The data transfer block 5 contains a modulator/demodulator (hereinafter referred to as modem) 501 for converting data from digital form to analog form, and vice versa, and a network control unit (hereinafter referred to as NCU) 502 for addressing other user terminals and establishing communications line connections.

The operating block 7 is used for entering a recipient's facsimile number and facsimile transmission start/stop commands, for example.

The display block 8 includes an alphanumeric readout for indicating various kinds of text information such as the recipient's name, facsimile number, activation/deactivation status of cryptographic communications, line connection and transmission status in facsimile transmission as well as status of communications with the personal computer PC. The speaker 9 is used to generate an audible warning and to verbally communicate part of the aforementioned text information.

The communications controller 10 is for controlling serial data communications in a start-stop transmission system and is representative of the data reception control device of the present invention.

Figure 2:
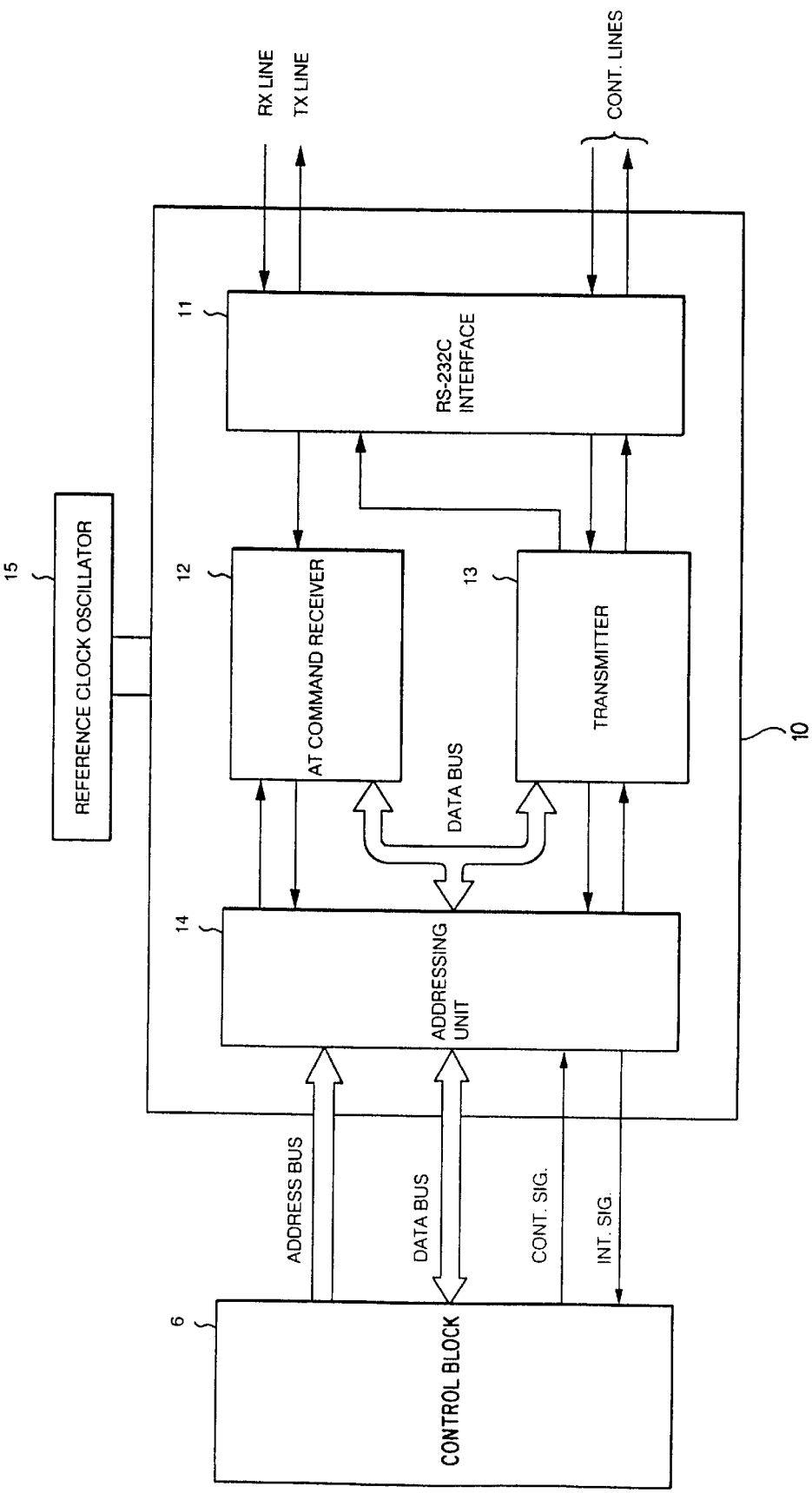
FIG. 2 is a block diagram of a communications controller which is representative of the data reception control device.

FIG. 2 is a block diagram of the communications controller 10.

The communications controller 10 comprises an RS-232C interface 11, an AT command receiver 12, a transmitter 13, an addressing unit 14 and a reference clock oscillator 15. Operation of the individual elements of the communications controller 10 is controlled based on a 9.8304 MHz reference clock RCLK generated by the reference clock oscillator 15.

The RS-232C interface 11 serves to convert the signal level of data inputted from the personal computer PC to a signal level suitable for handling in the communications controller 10. The facsimile machine 12 is for receiving an AT command fed from the personal computer PC and the transmitter 13 is for transmitting specific data in response to the AT command to the personal computer PC. The addressing unit 14 works as an interface for connecting the communications controller 10 to the control block 6. PC communications data, address data, various control signals and interrupt signals INT are exchanged via the addressing unit 14.

The aforementioned control signals include a data read signal CSD for requesting readout of the AT command, a format read signal RFT for requesting readout of the data format of the data received from the personal computer PC, an overrun read signal ROR for requesting readout of an overrun flag which indicates an AT command overrun condition (in which a certain data set is received before a preceding data set is fully received resulting in partial or total destruction of the preceding data set) and a chip select signal. These control signals are transmitted from the control block 6 to the communications controller 10. An interrupt signal INT is transmitted from the communications controller 10 to the control block 6 indicating that the communications controller 10 has received data from the personal computer PC.

The communications controller 10 transmits the interrupt signal INT to the control block 6 each time a group of bits constituting each character of an AT command is received. From the interrupt signal INT, the control block 6 recognizes that character data has been received. Subsequently, the control block 6 transmits the data read signal CSD and specific address data to the communications controller 10 to read out the character data. Each set of character data thus obtained is stored in a specific location in the data buffer 601.

Figure 3:
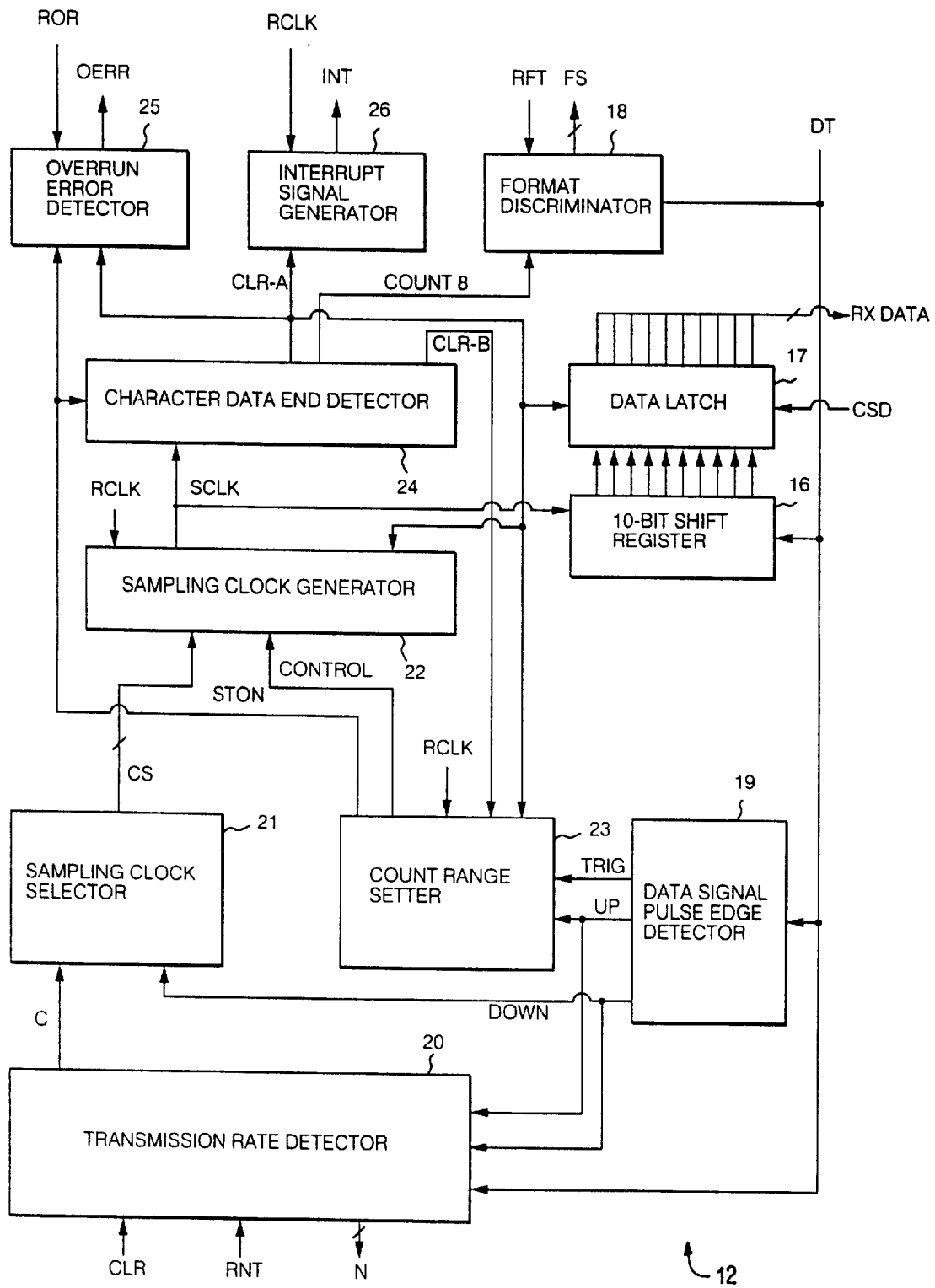
FIG. 3 is a block diagram of an AT command receiver contained in the communications controller.

FIG. 3 is a block diagram of the AT command receiver 12.

The AT command receiver 12 comprises a shift register 16. a data latch circuit 17, a format discriminator 18, a data signal pulse edge detector 19, a transmission rate detector 20, a sampling clock selector 21, a sampling clock generator 22, a count range setter 23, a character data end detector 24, an overrun error detector 25 and an interrupt signal generator 26.

The transmission rate detector 20 and sampling clock selector 21 work together as data transmission rate determination means of the invention while the sampling clock generator 22 constitutes clock generation means of the invention. Also, the control block 6 serves as data element analyzing means, judgment means and data reception control means of the invention while the data latch circuit 17 serves as data reception means of the invention. Operation of the control block 6 and AT command receiver 12 will be described in full detail later in this Specification.

Figure 4:
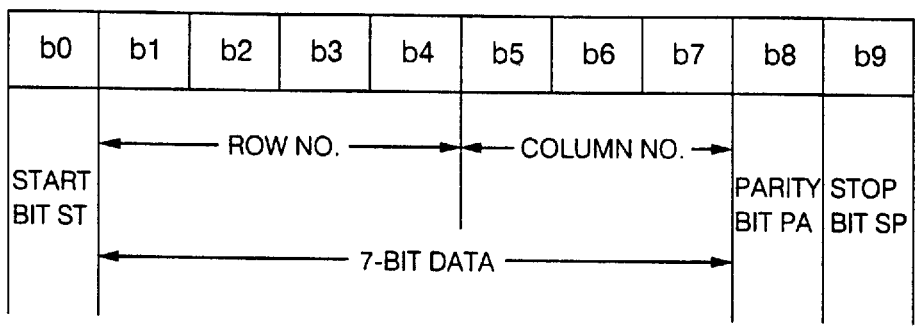
FIG. 4 is a diagram showing a construction of bits that constitute each character of an AT command.

The shift register 16 receives and temporarily holds serial data fed from the personal computer PC one character at a time. Each character of an AT command is made up of 10 bits including a start bit ST (first bit b0), seven information bits D (second bit b1 to eighth bit b7), a parity bit PA (ninth bit b8) and a stop bit SP (tenth bit b9) arranged in this order as shown in FIG. 4. A 10-bit shift register is therefore used as the shift register 16 to hold a total of 10 bits.

Each time a one-character portion of the data signal DT is stored in the shift register 16, the data latch circuit 17 latches that portion of the data signal DT and reads it as a group of character data elements. The format discriminator 18 determines from the received data signal DT the bit structure (or communications data format) of information bits D and parity bit PA as they are combined together.

Among the individual elements of the data signal DT, the information bits D and parity bit PA containing 8 bits in total constitute a substantial part of information to be communicated. Variations in the value of the parity bit PA of the characters "A" and "T" offer a choice of four different communications data formats shown in TABLE 1 below.

TABLE 1

| Data format | Contents |
| --- | --- |
| F(1) | Parity bit PA is set for even parity. |
| F(2) | Parity bit PA is set for odd parity. |
| F(3) | Parity bit PA is set to a fixed value "0". |
| F(4) | Parity bit PA is set to a fixed value "1". |

Character data is expressed by the use of ASCII (American Standard Code for Information Interchange) codes. In the ASCII code system, each character is identified by a unique code (IJ) which represents a combination of column number I and row number J defining, respectively, the 3 most significant bits and 4 least significant bits of a corresponding binary expression. The coded representations of the characters "A" and "T" are A=(41) and T=(54), respectively. In 7-bit binary representations, these are expressed as follows:

A(b1, b2, b3, b4, b5, b6, b7)=A(1000001)

T(b1, b2, b3, b4, b5, b6, b7)=T(0010101)

In 8-bit binary representations, the characters "A" and "T" are written as shown in TABLE 2 below according to the aforementioned four different data formats.

TABLE 2

| Data format | 8-bit data | |
|---|---|---|
| | A(b1–b7, b8) | T(b1–b7, b8) |
| F(1) | A(10000010) | T(00101011) |
| F(2) | A(10000011) | T(00101010) |
| F(3) | A(10000010) | T(00101010) |
| F(4) | A(10000011) | T(00101011) |

Upon receiving an AT command, the format discriminator 18 determines communications data format F(i) (where i=1, 2, 3 or 4) from bit patterns of the characters "A" and "T".

When an interrupt signal INT is entered, the control block 6 transmits the format read signal RFT to the format discriminator 18 and reads the results of communications data format discrimination. Then, the control block 6 analyzes data DT that follows the character "T" in accordance with the known data format F(i) and stores the received information bits D in a specific location in the data buffer 601.

On the other hand, when an echo of the data signal DT is requested by the personal computer PC, the format discriminator 18 does not determine the communications data format F(i). In this case, the control block 6 receives the data signal DT in accordance with a predefined data format, which will be described later, and returns the received data signal DT as it is to the personal computer PC. At the same time, the control block 6 stores data equivalent to the information bits D of the received data signal DT in a specific location in the data buffer 601.

When an echo operation is requested, the control block 6 immediately returns an echo of the received data signal DT. This is the reason why the format discriminator 18 does not determine the communications data format F(i) of the data signal DT. As shown in TABLE 2, there are four different communications data formats. To determine the data format F(i) of the data signal DT, it is necessary to receive both of the two characters "A" and "T" and identify bit patterns of these two 8-bit characters. This means that it would take a relatively long time until the control block 6 becomes ready to return an echo after receiving the data signal DT if the format discriminator 18 is required to determine the data format F(i).

According to this embodiment, the control block 6 returns an echo of the received data signal DT to the personal computer PC without causing the format discriminator 18 to determine the communications data format F(i) when an echo operation is requested. This arrangement serves to speed up the echo operation.

Figure 5:
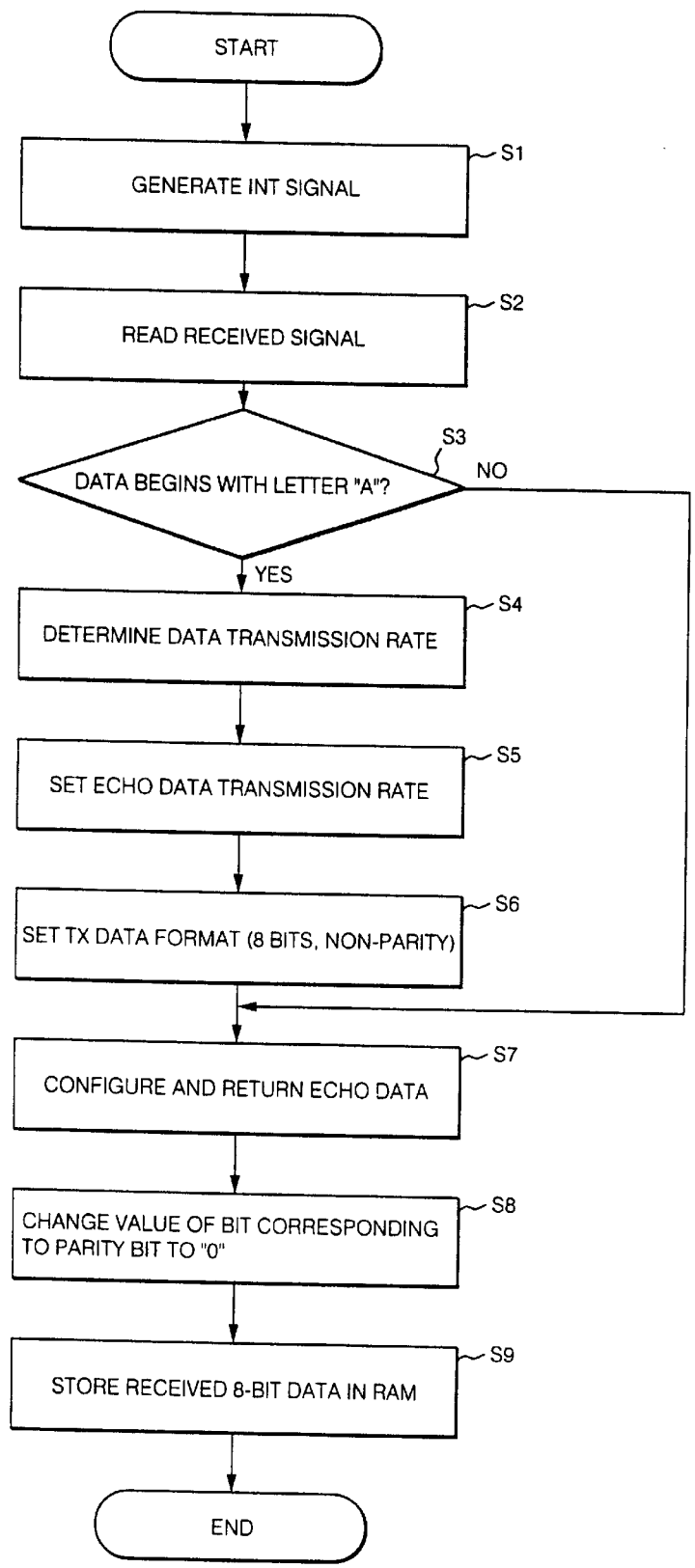
FIG. 5 is a flowchart showing a data reception control process executed when an echo operation is requested.

FIG. 5 is a flowchart showing a data reception control process executed when an echo operation is requested.

When the communications controller 10 receives an AT command, the interrupt signal generator 26 transmits an interrupt signal INT to the control block 6 of the facsimile machine 1 (Step S1). Upon receiving the interrupt signal INT, the control block 6 recognizes that the communications controller 10 has received the data signal DT from the personal computer PC. Then, the control block 6 transmits the data read signal CSD to the communications controller 10 and reads out the data signal DT (Step S2).

Figure 6:
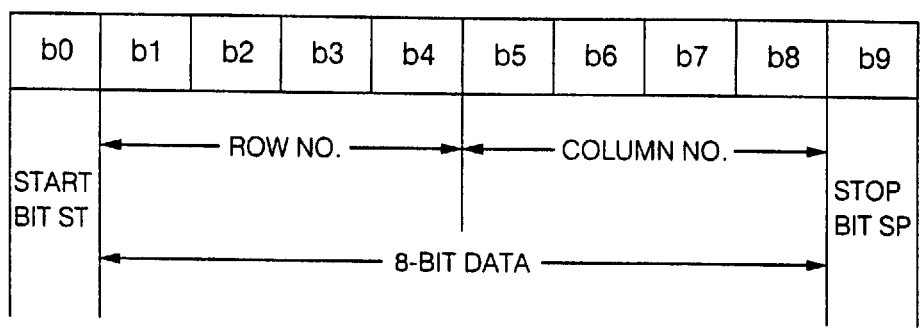
FIG. 6 is a diagram showing bit structures of communications data received in accordance with a received data format.

In Step S2, the data signal DT is read out in accordance with a received data format shown in FIG. 6. In this data format, a combination of the information bits D and parity bit PA of the received data signal DT is handled as 8-bit data made up of 8 information bits. As all the 8 bits are treated as information bits, it is not necessary to determine the communications data format F(i). In this case, it is possible to return an echo to the personal computer PC with a start bit ST and a stop bit SP directly added to the beginning and end of the 8-bit data.

Next, it is judged whether the data signal DT begins with the letter "A" (Step S3). If the data signal DT begins with the letter "A" (YES in Step S3), the data transmission rate is determined by measuring the bit length of the start bit ST of the letter "A" (Step S4). In this case, the echo transmission rate of the transmitter 13 is set to the data transmission rate obtained in Step S4 (Step S5). A method of determining the data transmission rate will be later described in detail.

Then, the transmitter 13 is set to use a transmit data format which is same as the received data format made up of a start bit ST, 8-bit data and a stop bit SP (Step S6).

Data to be returned as echo is configured in accordance with the above-mentioned transmit data format and the communications controller 10 transmits (or returns) the echo data to the personal computer PC (Step S7).

The value of the last bit b8 (corresponding to the parity bit PA) of the 8-bit data is changed to "0" (Step S8) and this value is stored in a specific location in the data buffer 601 (Step S9).

The value of the ninth bit b8 of the data signal DT is changed to "0" in the above process. This treatment is made for restoring an original code from the 8-bit data read out in accordance with the received data format.

FIG. 7 is a diagram showing bit structures and coded representations of the characters "A" and "T" received in accordance with the received data format.

If an echo operation is not requested, the characters "A" and "T" are received in accordance with a predefined communications data format F(i). Accordingly, their codes are A=(41) and T=(54), respectively. If there is made a request for echo, code numbers obtained from the characters "A" and "T" would differ from these values. This is because the column number portion of information bits D is represented in a 4-bit binary form in the latter case.

As an example, when the characters "A" and "T" transmitted in communications data format F(1) are received in accordance with the received data format, the resultant code of the letter "A" is the same as the transmitted code, but the letter "T" is received as the code "D4". Similarly, when the characters "A" and "T" transmitted in communications data format F(2) are received in accordance with the received data format, the received code of the letter "T" remains same as the transmitted code, but the letter "A" is received as the code "C1".

To avoid this inconvenience, the value of the ninth bit b8 is changed to "0" after receiving the data signal DT by using the received data format. With this treatment, the value of the ninth bit b8 does not affect the value of the information bits D which originally contain 7 bits and, therefore, the value of the 8-bit data eventually equals the value of the original 7-bit data.

Referring again to FIG. 5, if the received data signal DT does not begin with the letter "A" (NO in Step S3), it follows that the data transmission rate and data format have already been established. The operation flow skips Steps S4 to S6 and proceeds to Step S7, where an echo of the data signal DT is returned to the personal computer PC.

Returning to FIG. 3, the data signal Pulse edge detector 19 is a circuit for detecting falling edges and rising edges of the data signal DT.

Figure 8:
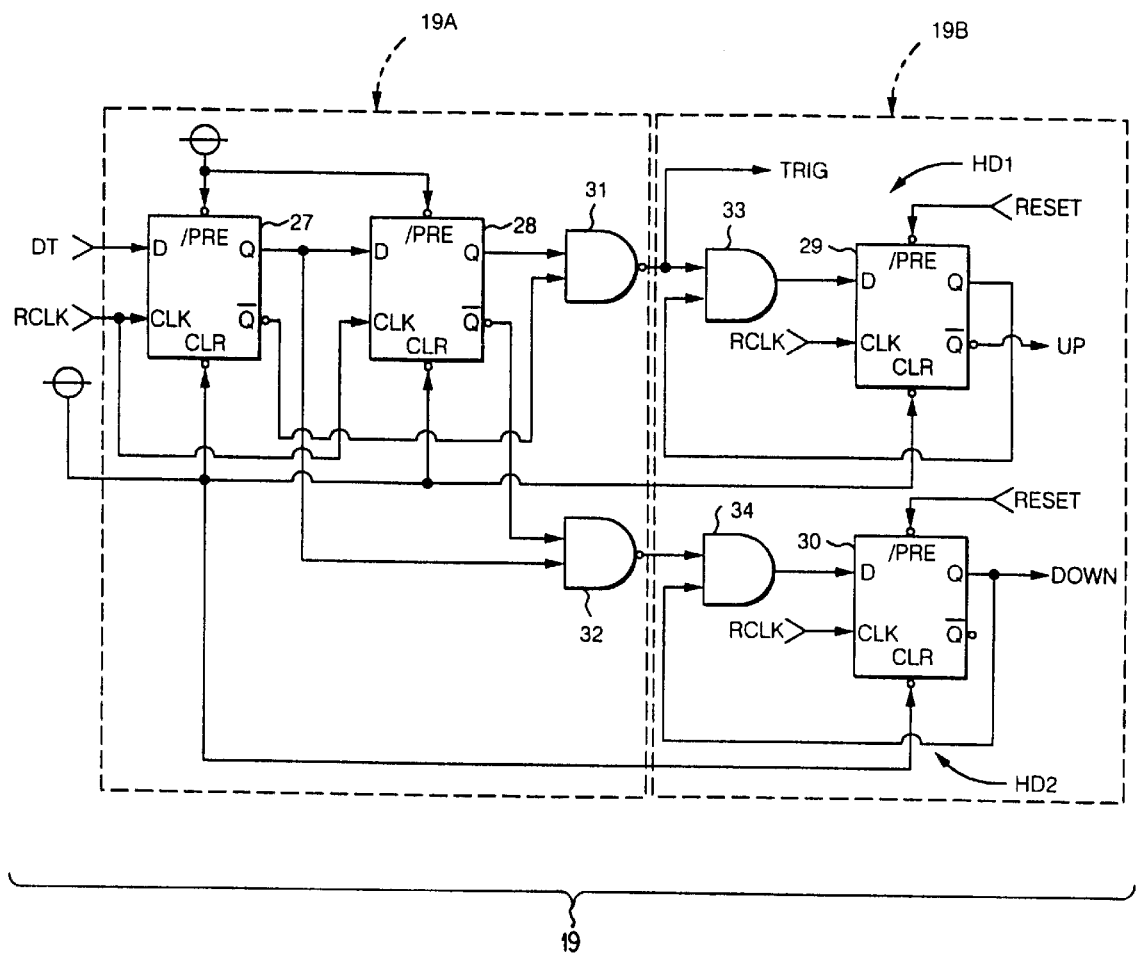
FIG. 8 is a circuit diagram of a data signal pulse edge detector.

FIG. 8 is a circuit diagram of the data signal pulse edge detector 19 according to the invention.

The data signal pulse edge detector 19 comprises a pulse edge detecting circuit 19A for detecting falling edges and rising edges of the data signal DT and a hold circuit 19B for holding a signal state representative of detection of a falling edge and a rising edge until a RESET signal is entered.

The pulse edge detecting circuit 19A comprises a pair of D-type flip-flops (hereinafter referred to as D-FF's) 27, 28, each provided with a set terminal PRE and a reset terminal CLR, and a pair of NAND circuits 31, 32.

The D-FF's 27, 28 are connected in cascade. The received data signal DT is inputted to the D terminal of the first D-FF 27 while a reference clock RCLK is entered to its CLK terminal. The Q output appearing at the Q terminal of the first D-FF 27 is delivered to the D terminal of the second D-FF 28 while the reference clock RCLK is entered to its CLK terminal. The Q output of the D-FF 28 and the inverted-Q output appearing at the inverted-Q terminal of the D-FF 27 are entered to the NAND circuit 31. Also, the inverted-Q output of the D-FF 28 and the Q output of the D-FF 27 are entered to the NAND circuit 32.

The CLR and PRE terminals of the D-FF's 27, 28 are set to an inactive state (High level).

The pulse edge detecting circuit 19A is constructed in such a manner that the NAND circuit 31 outputs a pulse signal TRIG at a time when a falling edge of the data signal DT is detected and the NAND circuit 32 outputs another pulse signal at a time when a rising edge of the data signal DT is detected.

The hold circuit 19B comprises a first hold circuit HD1 which holds a state representing detection of a first falling edge of the data signal DT and a second hold circuit HD2 which holds a state representing detection of a first rising edge of the data signal DT. The first hold circuit HD1 is configured with an AND circuit 33 and a D-FF 29 while the second hold circuit HD2 is configured with an AND circuit 34 and a D-FF 30.

The output (pulse signal TRIG) of the NAND circuit 31 and the Q output of the D-FF 29 are entered to the AND circuit 33 of the first hold circuit HD1 and an output of the AND circuit 33 is fed into the D terminal of the D-FF 29. Also, the output pulse (rising edge detect signal) of the NAND circuit 32 and the Q output of the D-FF 30 are entered to the AND circuit 34 of the second hold circuit HD2 and an output of the AND circuit 34 is fed into the D terminal of the D-FF 30.

The inverted-Q terminal of the D-FF 29 outputs an UP signal which holds a state indicating that the first falling edge of the data signal DT has been detected while the Q terminal of the D-FF 30 outputs an DOWN signal which holds a state indicating that the first rising edge of the data signal DT has been detected.

The CLR terminals of the D-FF's 29, 30 are set to an inactive state (High level). A RESET signal is individually entered to the PRE terminals of the D-FF's 29, 30 to reset the inverted-Q terminal of the D-FF 29 and the Q terminal of the D-FF 30.

The RESET signal is fed from the control block 6 for initializing individual circuits of the AT command receiver 12. Since individual AT commands could have different transmission rates and data formats, the control block 6 usually transmits the RESET signal to the AT command receiver 12 for resetting its individual circuits each time an AT command is received.

Figure 16:
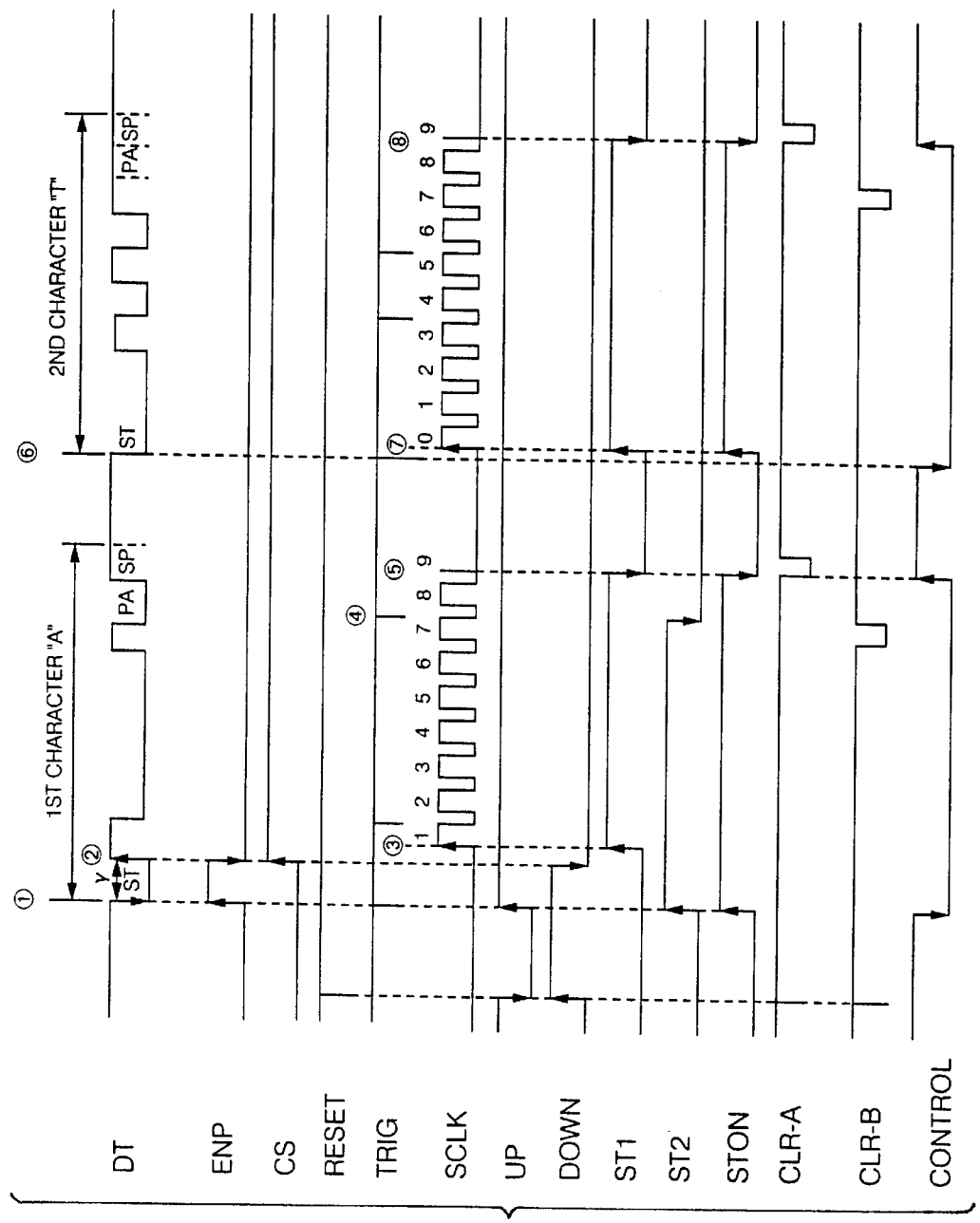
FIG. 16 is a time chart showing signals outputted from individual circuits concerned with data reception when the characters "A" and "T" of an AT command are received.

Referring now the time chart of FIG. 16, operation of the data signal pulse edge detector 19 is described.

FIG. 16 is a time chart showing various signals including data signal DT, TRIG signal, sampling clock SCLK. UP signal, DOWN signal, STON signal, CLR-A signal that will appear when the first character "A" and second character "T" of an AT command transmitted in communications data format F(1) are received.

The Q outputs of the D-FF's 27, 28 are pulses obtained by latching their D inputs at rising edges of the reference clock RCLK. For this reason, the Q output pulses of the D-FF's 27, 28 have a delay equivalent to one pulse of the reference clock RCLK compared to the respective D inputs. The inverted-Q outputs of the D-FF's 27, 28 are the same as the inverted-Q outputs. Thus, the inverted-Q outputs also have a delay equivalent to one pulse of the reference clock RCLK compared to the D inputs.

When the data signal DT is at a High level, a Low-level inverted-Q output of the D-FF 27 and a High-level Q output of the D-FF 28 are entered to the NAND circuit 31. In this case, the TRIG signal output of the NAND circuit 31 is at a High level. Also, since the D input of the D-FF 29 of the first hold circuit HD1 is at a High level, the inverted-Q output (or UP signal) of the D-FF 29 is held at a Low level.

Since a High-level Q output of the D-FF 27 and a Lowlevel inverted-Q output of the D-FF 28 are entered to the NAND circuit 32 in the above case, the output of the NAND circuit 32 is at a High level too. Also, since the D input of the D-FF 30 of the second hold circuit HD2 is at a High level, the Q output (or DOWN signal) of the D-FF 30 is held at a High level.

When the data signal DT changes from High level to Low level (point ① in FIG. 16). the Low-level inverted-Q output of the D-FF 27 fed into the NAND circuit 31 is inverted to a High level. Then, the High-level Q output of the D-FF 28 is inverted to a Low level with a delay equivalent to one pulse of the reference clock RCLK from the inverted-Q output inversion timing of the D-FF 27, causing the NAND circuit 31 to output a Low-level pulse (TRIG signal). As shown in FIG. 16, the TRIG signal is outputted each time the data signal DT changes from High level to Low level.

The TRIG signal delivered to the first hold circuit HD1 is entered to the D terminal of the D-FF 29 via the AND circuit 33. The Low-level TRIG signal is latched and outputted from the Q terminal of the D-FF 29. Since the Q output of the D-FF 29 is fed back to its own D terminal via the AND circuit 33, the Q output is held at a Low level.

The Q output (or UP signal) of the D-FF 29 changes from Low level to High level in synchronism with a falling edge of the data signal DT as shown in FIG. 16. Subsequently. the UP signal holds a High state when the falling edge (point ① in FIG. 16) of the start bit ST of the character "A" is detected.

On the other hand, signal levels of the Q output of the D-FF 27 and the inverted-Q output of the D-FF 28 fed into the NAND circuit 32 are also inverted in synchronism with the falling edge of the data signal DT. However, since the Q output of the D-FF 27 changes from High level to Low level earlier than the point of time when the inverted-Q output of the D-FF 28 changes from Low level to High level, the output of the NAND circuit 32 remains unchanged. Therefore, no change occurs in the DOWN signal outputted from the second hold circuit HD2 at the falling edge of the data signal DT as shown in FIG. 16.

When the data signal DT changes from Low level to High level (point ② in FIG. 16), the Low-level Q output of the D-FF 27 fed into the NAND circuit 32 is inverted to a High level. Then, the High-level inverted-Q output of the D-FF 28 is inverted to a Low level with a delay equivalent to one pulse of the reference clock RCLK from the Q output inversion timing of the D-FF 27, causing the NAND circuit 32 to output a Low-level pulse (rising edge detect signal).

The rising edge detect signal delivered to the second hold circuit HD2 is entered to the D terminal of the D-FF 30 via the AND circuit 34. The Low-level rising edge detect signal is latched and outputted from the Q terminal of the D-FF 30. Since the Q output (DOWN signal) of the D-FF 30 is fed back to its own D terminal via the AND circuit 34, the DOWN signal is held at a Low level.

It would be understood from above that the DOWN signal changes from High level to Low level at a rising edge of the data signal DT as shown in FIG. 16. Subsequently, the DOWN signal therefore holds a Low state when the rising edge (Point ② in FIG. 16) of the start bit ST of the character "A" is detected.

On the other hand, signal levels of the inverted-Q output of the D-FF 27 and the Q output of the D-FF 28 fed into the NAND circuit 31 are also inverted in synchronism with the rising edge of the data signal DT. However, since the inverted-Q output of the D-FF 27 changes from High level to Low level earlier than the point of time when the Q output of the D-FF 28 changes from Low level to High level, the output of the NAND circuit 31 remains unchanged. Therefore, no change occurs in the UP signal outputted from the first hold circuit HD1 at the rising edge of the data signal DT as shown in FIG. 16.

Returning again to FIG. 3, the transmission rate detector 20 is a circuit for determining the transmission rate of the data signal DT received from the personal computer PC. In this embodiment, the data signal DT is transmitted at one of the seven predefined transmission rates (i.e., 300 bps, 600 bps, 1200 bps, 2400 bps, 4800 bps, 9600 bps and 19200 bps) and the actual transmission rate is determined by measuring the bit length of the start bit ST of the character "A" with which each AT command begins.

More particularly, the transmission rate detector 20 determines the data transmission rate by counting the number of pulses of the reference clock RCLK contained in the start bit ST of the first character "A" of an AT command.

Provided that the number of clock pulses is N bps and the frequency of the reference clock RCLK is f Hz, the bit length τ of the start bit ST is 1/N and the pulse length t of the reference clock RCLK is 1/f. Further, the number of clock pulses contained in the bit length τ is calculated by C=f/N. The data transmission rate is thus given by N=f/C.

As already mentioned, the data transmission rate N is a one of discrete values preset within a range of 300 bps to 19200 bps. Since there is a one-to-one correspondence between the values N and C, the transmission rate detector 20 outputs a count C of reference clock pulses as a measurement of the transmission rate N.

Figure 9:
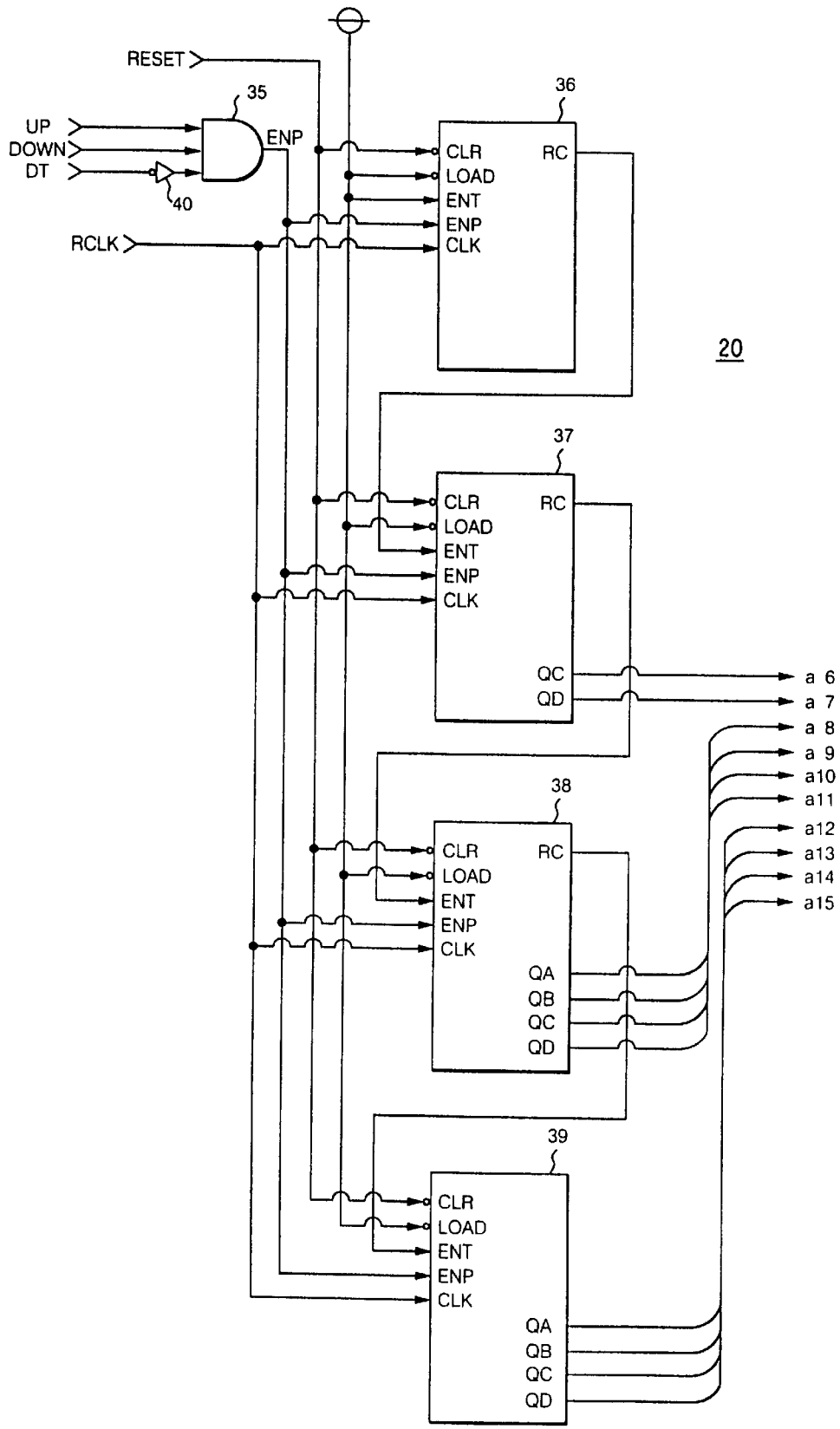
FIG. 9 is a circuit diagram of a transmission rate detector.

FIG. 9 is a circuit diagram of the transmission rate detector 20 according to the invention.

The transmission rate detector 20 has an integrated circuit (hereinafter referred to as IC) comprising four 4-bit binary counters 36–39 connected in cascade to count binary-coded hexadecimal values.

The transmission rate detector 20 is a 16-digit binary counter. Binary counts of the higher 10 digits are outputted from QC and QD terminals of the binary counter 37 and QA to QD terminals of the binary counters 38 and 39. The count C of reference clock pulses can be expressed as follows:

$$C = a15 \times 2^{15} + a14 \times 2^{14} + \ldots + a6 \times 2^6 + a5 \times 2^5 + \ldots + a1 \times 2^1 + a0 \times 2^0$$

With this representation, the outputs from the QA to QD terminals of the binary counter 39 correspond to a15, a14, a13 and a12, respectively; the outputs from the QA to QD terminals of the binary counter 38 correspond to a11, a10, a9 and a8, respectively; and the outputs from the QC and QD terminals of the binary counter 37 correspond to a7 and a6, respectively. This means that the transmission rate detector 20 outputs count data representing the clock pulse count C as they are counted in groups of 64 pulses.

The CLR terminals of the binary counters 36–39 are for resetting all their outputs. When they are set to a Low level, the RC terminals and QA to QD terminals are reset to a Low level. A RESET signal is fed from the control block 6 to each CLR terminal.

The LOAD terminals of the binary counters 36–39 are for controlling output status of their QA to QD terminals. When the LOAD terminals are set to a High level, the count data is outputted from the QA to QD terminals.

The CLK terminals of the binary counters 36–39 are input terminals for individual pulses of the reference clock RCLK to be counted. The ENT and ENP terminals of the binary counters 36–39 are for controlling clock pulse count operation.

When the ENT and ENP terminals are set to a High level, the binary counters 36–39 become ready to start counting and count values of reference clock pulses entered to the CLK terminals are outputted from the QA to QD terminals.

Entered to the individual ENP terminals are an output of an AND circuit, which is a logical product of the data signal DT and the UP and DOWN signals fed from the data signal pulse edge detector 19. The AND circuit 35 is for detecting the start bit ST of the first character "A" of each AT command and outputting a control signal ENP which causes the binary counters 36–39 to count individual pulses of the reference clock RCLK for a duration of the start bit ST. Since the start bit ST is a Low-level signal, the data signal DT is reversed in polarity by an inverter 40 before entering the AND circuit 35.

The ENT terminal of the binary counter 36 is set to a High level while an RC output is entered to the ENT terminal of each binary counter from an RC terminal of the preceding stage.

The RC output of each binary counter is set to High level when its QA to QD outputs become all High, or when its pulse count becomes 15. The RC output therefore indicates a carry (or overflow) state of a binary-coded hexadecimal number. The four binary counters 36–39 are connected in cascade in such a manner that the RC output of one binary counter is entered to the ENT terminal of the succeeding binary counter. With this arrangement, the reference clock RCLK is divided to $\frac{1}{16}$, $\frac{1}{16^2}$, $\frac{1}{16^4}$ by the binary counters 37 to 39, respectively.

According to the above-described construction, when the first character "A" of an AT command is received, the ENP signal outputted from the AND circuit 35 to the binary counters 36–39 is made High during a period of the start bit ST of the character "A" as shown in FIG. 16. The number of pulses of the reference clock RCLK is counted during this period and the resultant count data, which represents the data transmission rate, is sent to the sampling clock selector 21.

When the AT command receiver 12 receives the character "A" of the AT command, the transmission rate detector 20 determines the data transmission rate and all the remaining characters of the AT command are received in accordance with this data transmission rate.

When all the characters of the AT command have been received, the control block 6 transmits a RESET signal to the AT command receiver 12, and the count data of the transmission rate detector 20 is reset. When the character "A" of a next AT command is received, the transmission rate detector 20 determines its transmission rate again. The transmission rate of each AT command is determined in this manner each time its first character "A" is received.

Data communications between the facsimile machine 1 and personal computer PC are controlled by AT commands. The personal computer PC transmits a particular AT command requesting the communications controller 10 to select Class 1 facsimile mode (hereinafter referred to as Class 1 communications mode) so data is exchanged in Class 1 communications mode.

In Class 1 communications mode, the personal computer PC transmits not only AT commands but also those commands which do not start with the characters "AT" to the communications controller 10. The transmission rate is, however, fixed to 19200 bps in Class 1 communications mode. The communications controller 10 may retain the transmission rate determined from the AT command requesting Class 1 communications mode or the transmission rate determined from any AT command directly preceding a non-AT command so that the AT command receiver 12 can properly receive commands starting other than the characters "AT".

FIG. 10 is a diagram showing an example of a data exchange procedure in Class 1 communications mode using AT commands.

In the example of FIG. 10, AT command "AT+FCLASS=1" of step No. 4 is a command specifying Class 1 communications mode.

Data communications could possibly be done at different transmission rates in step Nos. 1 to 4, and 12 and onward, but in step Nos. 5 to 11 data is exchanged at a fixed transmission rate of 19200 bps regardless of whether the individual commands start with the characters "AT" because Class 1 communications mode is specified in step No. 4.

In a preferred form of embodiment transmission of the RESET signal to the communications controller 10 is prohibited when Class 1 communications mode is specified by the AT command "AT+FCLASS=1" and the transmission rate is determined upon receiving it, and transmission of the RESET signal would be enabled when AT command "AT+FCLASS=0" is received. With this arrangement, data is exchanged at a transmission rate of 19200 bps determined from the AT command "AT+FCLASS=1" so that the AT command receiver 12 can receive a procedural signal DCS and training signal TCF starting with other than the characters "AT".

In the above form of embodiment, the transmission rate detector 20 determines a data transmission rate depending on the contents of each individual AT command. This would require rather complicated control of circuit operation. Preferably, the transmission rate detector 20 should determine transmission rates of all the AT commands received and a transmission rate determined from a preceding AT command should be used for receiving a command starting with other than the characters "AT".

In Class 1 communications mode, types of AT commands transmitted immediately before those commands which do not start with the characters "AT" are limited. For example, AT command "AT+FTH=3" is always transmitted immediately before a procedural signal DCS, and AT command "AT+FTM= . . . " is always transmitted immediately before a training signal TCF, as shown in FIG. 10.

Therefore, contents of each AT command may be analyzed when it is received. In this case, if the received AT command is of a specific type, the transmission rate determined from the AT command is preserved to allow the AT command receiver 12 to properly receive a non-AT command which will be transmitted next.

Figure 11:
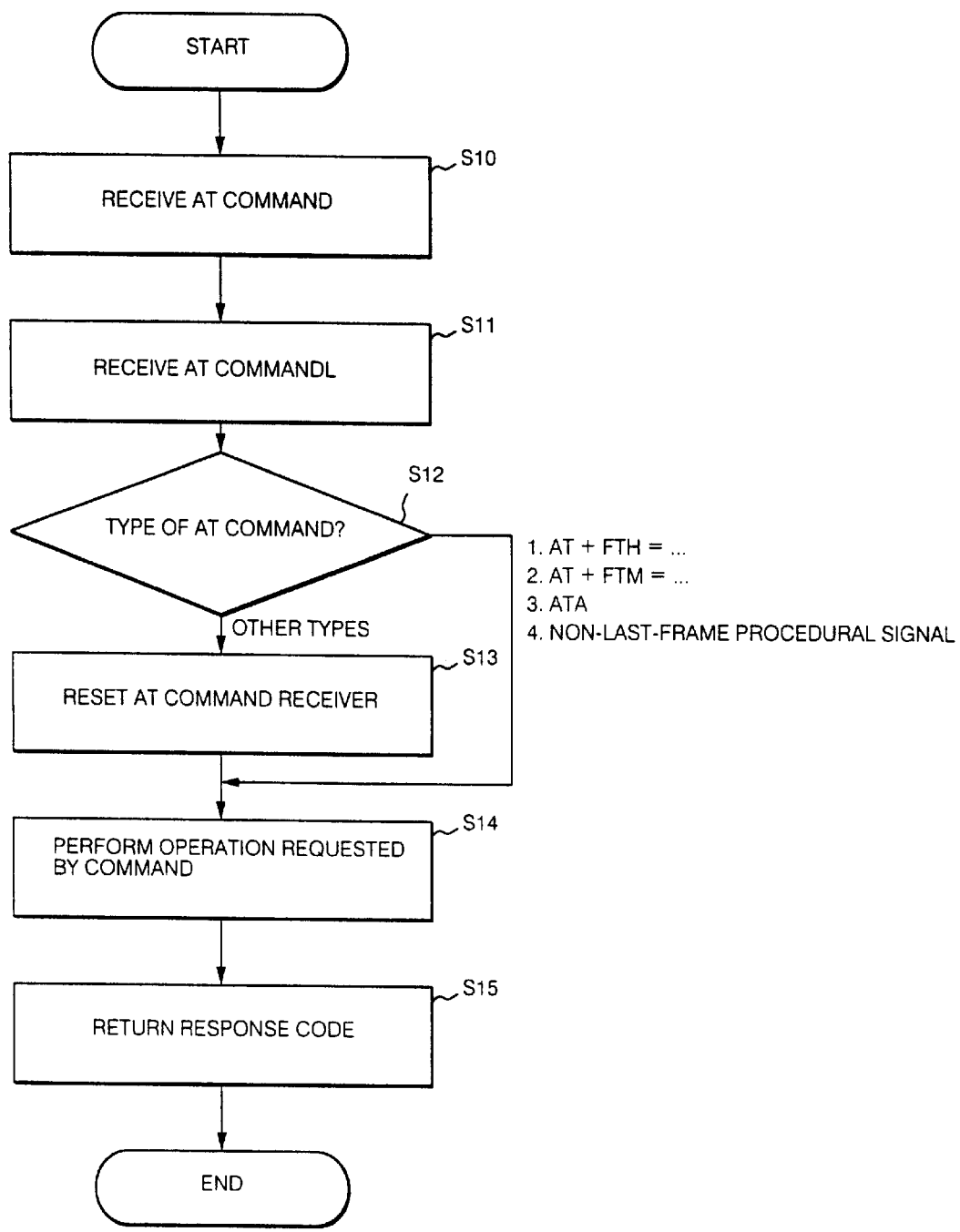
FIG. 11 is a flowchart showing a data receive Procedure performed in Class 1 communications mode using AT commands.

Referring now to the flowchart of FIG. 11, the following discussion briefly describes a data receive procedure performed in Class 1 communications mode using AT commands. When an AT command is received (Step S10), the control block 6 analyzes contents of the AT command (Step S11). Next, the AT command is checked to determine whether it is "AT+FTH= . . . ", "AT+FTM= . . . ", ATA or a non-last-frame procedural signal (Step S12). If the AT command does not belong to any of these four types, the control block 6 outputs a RESET signal to the communications controller 10 for resetting the transmission rate detector 20 (Step S13). If the AT command belongs to one of the above-mentioned four types. Step S13 is skipped so that the control block 6 does not output a RESET signal.

Next, an operation requested by the received AT command is carried out (Step S14) and the control block 6 returns a predefined response code such as "OK" to the personal computer PC via the communications controller 10 to complete the AT command receive procedure (Step S15).

According to the circuit construction of this embodiment, the transmission rate detector 20 is activate to determine the data transmission rate whenever a command is received. When an AT command immediately preceding a command which does not start with the characters "AT" is received, a RESET signal is fed from the control block 6 to the communications controller 10 so that the transmission rate determined from the AT command would be preserved for reception of the succeeding command without the initial "AT".

In one variation of the embodiment, the transmission rate detector 20 is deactivated to cancel its transmission rate determination process when reception of an AT command immediately preceding a command without the initial "AT" has been completed. In this variation, the command without the initial "AT" is received by using a sampling clock SCLK generated by the sampling clock generator 22 which will be described later in detail.

In AT command-based Class 1 communications mode described above, when an AT command is received, it is judged whether a next command is of a type without the initial "AT" and transmitted at the same transmission rate as the AT command based on the type of the AT command. If the next command is of a type transmitted at the same transmission rate, it is received in accordance with the transmission rate determined from the AT command. Therefore, all incoming commands can be properly received by the AT command receiver 12 regardless of whether each individual command starts with the characters "AT". This makes it possible to simplify command receiving circuit construction.

Returning once again to FIG. 3, the sampling clock selector 21 is a circuit for outputting a clock select signal CS corresponding to a specific transmission rate based on the count data outputted from the transmission rate detector 20.

As already mentioned, AT commands from the personal computer PC are transmitted at one of the following transmission rates: 19200 bps, 9600 bps, 4800 bps, 2400 bps, 1200 bps, 600 bps and 300 bps.

Now, representing these transmission rates by N0, N1, N2, N3, N4, N5 and N6 in the descending order and corresponding counts of reference clock pulses by C0, C1, C2,C3, C4, C5 and C6, respectively, values of pulse counts Ci (i=. . . 6) and transmission rates Ni (i=0, 1, . . . 6) become as shown in TABLE 3 below provided that the frequency f of the reference clock RCLK is 9.8304 MHz.

TABLE 3

| i | Transmission rate Ni (bps) | Count of clock pulses Ci |
|---|---|---|
| 0 | 19200 | 512 |
| 1 | 9600 | 1024 |
| 2 | 4800 | 2048 |
| 3 | 2400 | 4096 |
| 4 | 1200 | 8192 |
| 5 | 600 | 16384 |
| 6 | 300 | 32768 |

When the data signal DT is entered to the DT input of the transmission rate detector 20, the reference clock count C outputted from the transmission rate detector 20 will take a count value Ci shown in TABLE 3 or a value Ci' very close to Ci.

If, however, a low level pulse other than the actual start bit ST of the character "A" is entered to the DT input due to extraneous noise for instance, the transmission rate detector 20 outputs a false count C" which is different from either of the values Ci and Ci'. For this reason, it would be required to provide a judgment circuit for checking whether a signal fed into the DT input of the transmission rate detector 20 is certainly the data signal DT and a reset circuit for resetting a count sequence of the transmission rate detector 20 if the signal fed into the DT input is not the data signal DT.

In this embodiment, all possible values of reference clock pulse count C are allocated to certain values of transmission rate Ni as shown in TABLE 4 so that the sampling clock selector 21 outputs a clock select signal CSi (i=0, 1, . . . 6) corresponding to a certain transmission rate Ni, whatever value of reference clock pulse count C the transmission rate detector 20 may output. This construction eliminates the need for the aforementioned judgment circuit and reset circuit, resulting in simplification of the transmission rate detector 20.

In TABLE 4, boundary value Cki (i=0, 1, . . . 6) of each range of counts C is set to the mean value Cm of counts Ci and C(i+1) corresponding to two adjacent transmission rates Ni and Ni(i+1); thus, Cm=(Ci+C(i=1))/2. The boundary value Cki need not necessarily take the mean value Cm, but may take any value between Ci and C(i+1).

As an example, although boundary value Ck1 of the range of counts C is set to the mean value Cm (=(C0+C1)/2=768) of counts C0 (=512) and C1 (=1024) which correspond to transmission rates N0 (=19200 bps) and N1 (=9600 bps) in TABLE 4, any count value C arbitrarily chosen between 513and 1023 may be used as boundary value Ck1.

TABLE 4

| Range of counts C | Transmission rate (bps) | Select signal |
|---|---|---|
| –767 | 19200 | CS0 |
| 768–1535 | 9600 | CS1 |
| 1536–3071 | 4800 | CS2 |
| 3072–6143 | 2400 | CS3 |
| 6144–12287 | 1200 | CS4 |
| 12288–24575 | 600 | CS5 |
| 24576– | 300 | CS6 |

Figure 12:
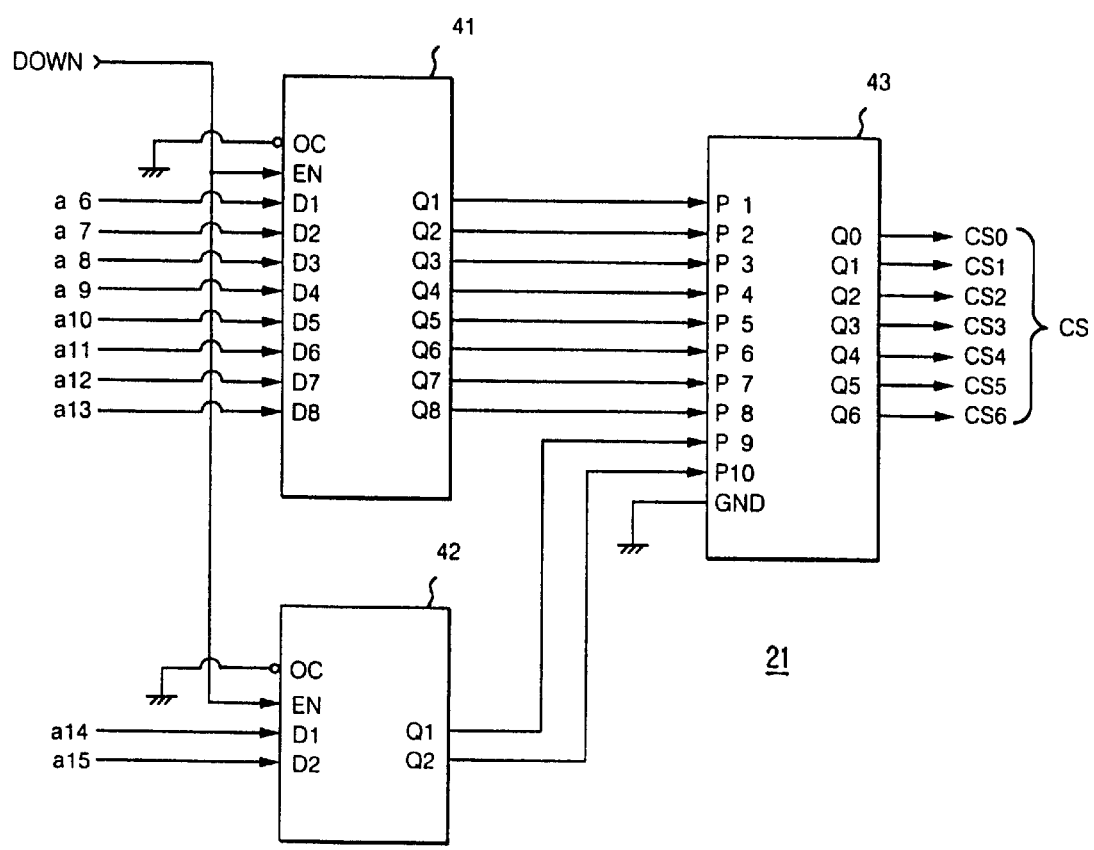
FIG. 12 is a circuit diagram of a sampling clock selector.

FIG. 12 is a circuit diagram of the sampling clock selector 21 according to the invention.

The AT command receiver 12 comprises IC's including two latch circuits 41, 42 and a programmable logic circuit 43. The two latch circuits 41. 42 are connected in parallel. Connected to input terminals D1 to D8 of the latch circuit 41 are the QC and QD outputs of the binary counter 37 of the transmission rate detector 20, QA to QD outputs of the binary counter 38, and QA and QB outputs of the binary counter 39, respectively. Connected to input terminals D1 and D2 of the latch circuit 42 are the QC and QD outputs of the binary counter 39, respectively.

Terminals OC of the latch circuits 41, 42 are output control terminals. When the OC terminals are set to a Low level the QA to QD terminals are made ready to output. Terminals EN of the latch circuits 41, 42 are enable terminals. When the EN terminals are set to a High level data signals entered to the input terminals D1 to D8 are latched and outputted from output terminals Q1 to Q8.

More particularly, the DOWN signal outputted from the data signal pulse edge detector 19 is entered to the EN terminals and reference clock pulse count data is latched at the rising edge (point ② in FIG. 16) of the start bit ST of the character "A". This count data is outputted from the Q1 to Q8 terminals.

The programmable logic circuit 43 is a circuit for generating a clock select signal CSi by using the count data. The Q1 to Q8 outputs of the latch circuit 41 are entered to input terminals P1 to P8 of the programmable logic circuit 43 while the Q1 and Q2 outputs of the latch circuit 42 are entered to input terminals P9 and P10 of the programmable logic circuit 43, respectively.

Terminals Q0 to Q6 of the programmable logic circuit 43 are output terminals for clock select signals CS0 to CS6, respectively. One of these terminals Q0–Q6 outputs a clock select signal CSi (i=0, 1, . . . 6) corresponding to the reference clock pulse count data entered to the P1 to P8 terminals of the programmable logic circuit 43 according to the relationship between count values C and clock select signal CSi shown in TABLE 4.

If (P1, P2, P3, P4, P5, P6, P7, P8, P9, P10)= (0000001011), for example, the count value C is 704. In this case, outputs CS(Q0, Q1, Q2, Q3, Q4, Q5, Q6) from the Q0 to Q6 terminals are CS(1000000) and, therefore, a High-level clock select signal CS0 is outputted from the Q0 terminal. Similarly, if (P1, P2, P3, P4, P5, P6, P7, P8, P9, P10)=(0000001100), the count value C is 768. In this case, CS(Q0, Q1, Q2, Q3, Q4, Q5, Q6)=CS(0100000) and a High-level clock select signal CS1 is outputted from the Q1 terminal.

Returning again to FIG. 3, the sampling clock generator 22 generates from the reference clock RCLK seven types of sampling clocks SCLK having different frequencies (fs= 19200 Hz, 9600 Hz, 4800 Hz, 2400 Hz, 1200 Hz, 600 Hz, 300 Hz) corresponding to the individual values of transmissionrates Ni, and outputs one of these sampling clocks SCLK selected by the clock select signal CS.

Figure 13:
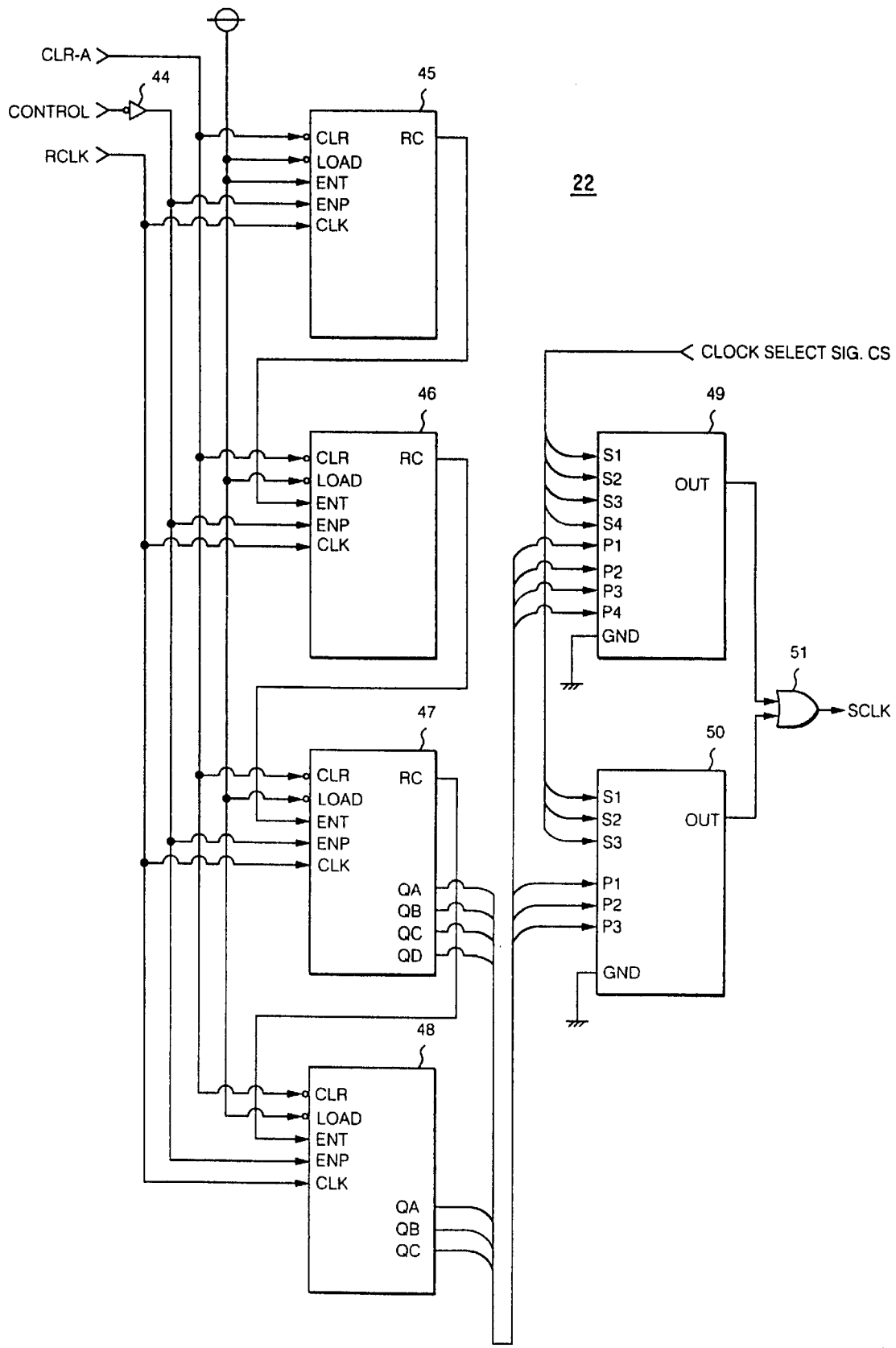
FIG. 13 is a circuit diagram of a sampling clock generator.

FIG. 13 is a circuit diagram of the sampling clock generator 22 according to the invention.

The sampling clock generator 22 comprises four 4-bit binary counters 45–48 of the same type as the 4-bit binary counters 36–39 of the transmission rate detector 20 and two programmable logic circuits 49, 50 of the same type as the programmable logic circuit 43 of the sampling clock selector 21.

The four binary counters 45–48 are connected in cascade in such a manner that RC output of one binary counter is entered to the ENT terminal of the succeeding binary counter as is the case with the transmission rate detector 20.

Terminals QA to QD of the binary counter 47 output 19200 Hz, 9600 Hz, 4800 Hz and 2400 Hz sampling clocks SCLK, respectively, while terminals QA to QC of the binary counter 48 output 1200 Hz, 600 Hz and 300 Hz sampling clocks SCLK, respectively.

Inputted to individual CLR terminals of the binary counters 45–48 is a CLR-A signal outputted from the character data end detector 24 which will be described later. The LOAD terminals of the binary counters 45–48 are set to a High level. The CLR-A signal is a signal indicating detection of a stop bit SP which denotes the end point of each character received. The sampling clocks SCLK are reset each time the CLR-A signal is received at the end of a character.

The reference clock RCLK is inputted to individual CLK terminals of the binary counters 45–48 while a CONTROL signal outputted from the count range setter 23 to be described later is entered to individual ENP terminals. The CONTROL signal is a signal for determining a time period during which the sampling clocks SCLK are produced by controlling the operation (division of reference clock RCLK) of the sampling clock generator 22.

The programmable logic circuits 49, 50 are individually provided with select terminals S1–S4, input terminals P1–P4 and an output terminal OUT. They are programmed in such a manner that when a select terminal Si (i=1, 2, 3, 4) is set to an active state (High level), a signal entered to a corresponding input terminal Pi (i=1, 2, 3, 4) appears at the output terminal OUT.

Output signals from the OUT terminals of the programmable logic circuits 49, 50 are entered to an OR circuit 51 so that a selected sampling clock SCLK is sent to succeeding circuits via the OR circuit 51.

The clock select signals CS0 to CS3 fed from the sampling clock selector 21 are entered to the select terminals S1 to S4 of the programmable logic circuit 49, respectively, while the clock select signals CS4 to CS6 fed from the sampling clock selector 21 are entered to the select terminals S1 to S3 of the programmable logic circuit 50, respectively.

Furthermore, the QA to QD outputs of the binary counter 47 are entered to the input terminals P1 to P4 of the programmable logic circuit 49, respectively, while the QA to QC outputs of the binary counter 48 are entered to the input terminals P1 to P3 of the programmable logic circuit 50, respectively.

According to the above-described circuit construction, if clock select signal CS(1000000) is entered from the sampling clock selector 21, for example, the sampling clock SCLK (fs=19200 Hz) fed into the P1 terminal of the programmable logic circuit 49 appears at its OUT terminal. The 19200 Hz sampling clock SCLK is then sent to the count range setter 23 and character data end detector 24 via the OR circuit 51.

Similarly, if clock select signal CS(0000100) is entered from the sampling clock selector 21, the sampling clock SCLK (fs=1200 Hz) fed into the P1 terminal of the programmable logic circuit 50 appears at its OUT terminal. The 1200 Hz sampling clock SCLK is then sent to the count range setter 23 and character data end detector 24 via the OR circuit 51.

Referring again to FIG. 3, the count range setter 23 is a circuit for setting a count range of a sampling clock SCLK and the character data end detector 24 is a circuit for detecting the eighth bit b7 (or the last information bit) and tenth bit b9 (or the stop bit SP) of each character received by counting a specified number of pulses of the sampling clock SCLK.

If the personal computer PC transmits character data of each AT command with exactly the same time intervals between successive characters and a sampling clock SCLK having an appropriate frequency is generated in synchronism with the first character "A" with which the AT command begins, it would be possible to keep the sampling clock SCLK in exact synchronism with the second and succeeding characters of the AT command. In serial data communications in a start-stop transmission system, however, synchronization is established by a receiver with reference to a start bit ST and a stop bit SP contained in received data for properly receiving data signals. Therefore, it is to be noted that successive characters of the AT command may not be transmitted at exactly constant intervals.

In this embodiment, the sampling clock SCLK is generated when each group of signal elements constituting a character is received. Specifically, the sampling clock SCLK is generated in synchronism with the start bit ST of the character received. The sampling clock SCLK is stopped when the stop bit SP (which represents the character data end point) of the character is detected by counting individual pulses of the sampling clock SCLK. The sampling clock SCLK is synchronized with signal elements of each character in this manner.

Figure 14:
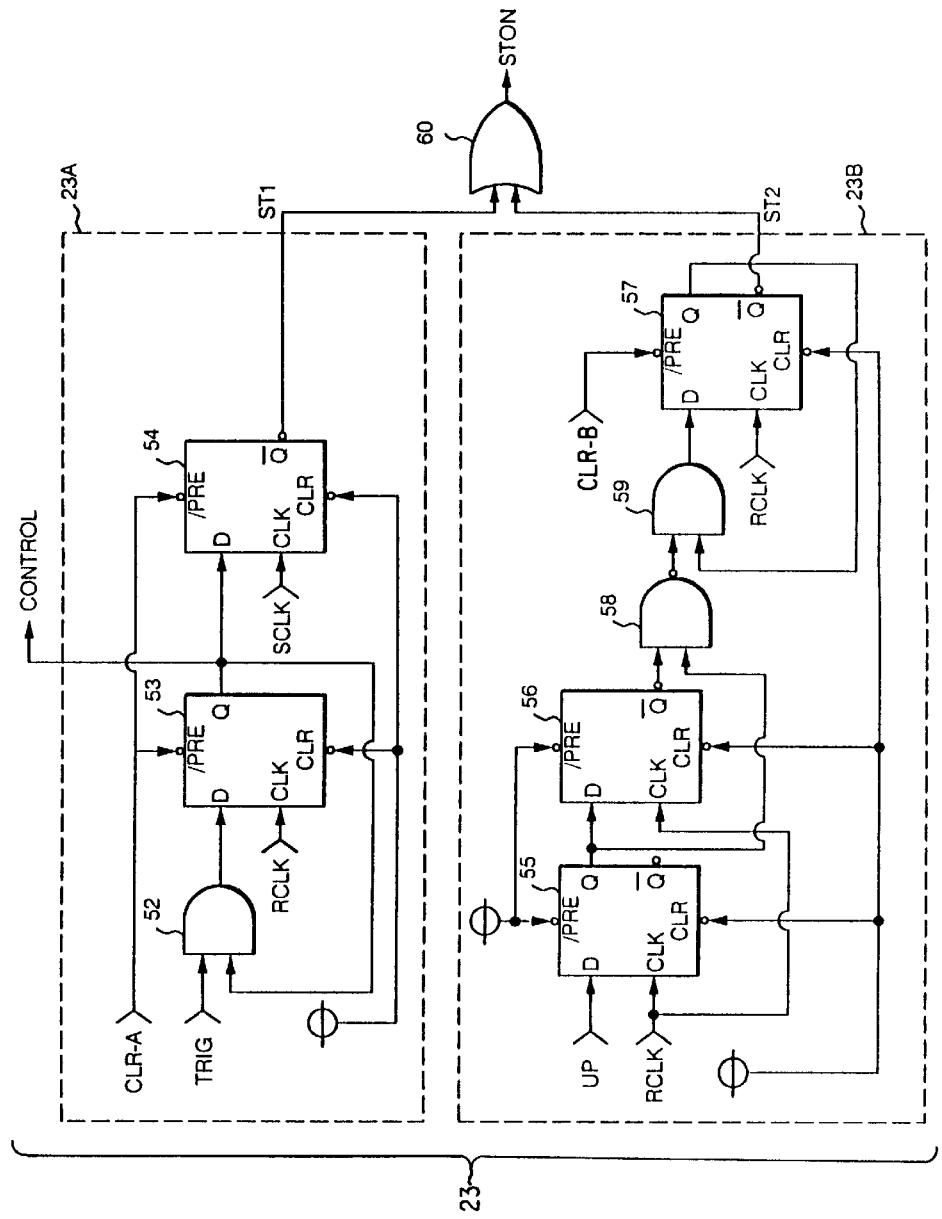
FIG. 14 is a circuit diagram of a count range setter.
Figure 15:
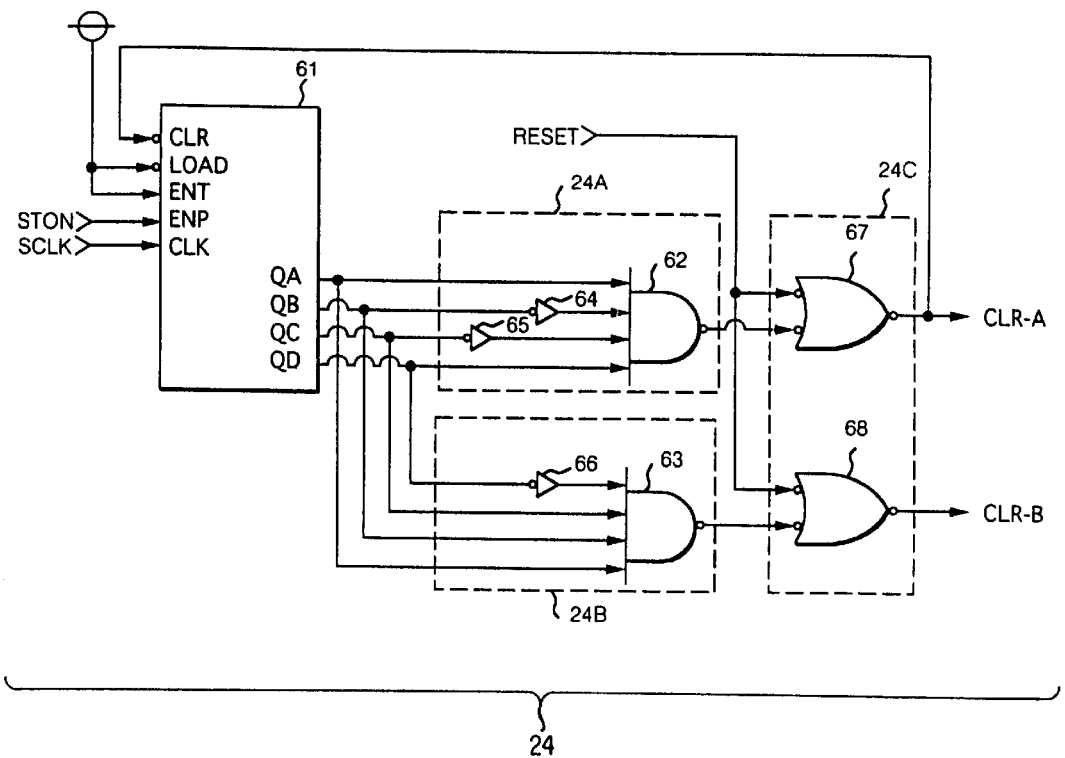
FIG. 15 is a circuit diagram of a character data end detector.

FIG. 14 is a circuit diagram of the count range setter 23 according to the invention. FIG. 15 is a circuit diagram of the character data end detector 24 according to the invention.

As shown in FIG. 14, the count range setter 23 comprises a first count control circuit 23A for controlling a count period of the sampling clock SCLK for the first character "A" and a second count control circuit 23B for controlling sampling clock pulse count periods for the second and succeeding characters.

The first count control circuit 23A comprises a pair of D-FF's 53, 54 and an AND circuit 52. The TRIG signal (shown in FIG. 8) is entered to one input terminal of the AND circuit 52 while the Q output of the D-FF 53 is entered to the other input terminal of the AND circuit 52. The output of the AND circuit 52 is entered to the D terminal of the D-FF 53. The Q output of the D-FF 53 is the already mentioned CONTROL signal. It is entered to the D terminal of the D-FF 54 as well as to the sampling clock generator 22.

The reference clock RCLK is inputted to the CLK terminal of the D-FF 53 while the sampling clock SCLK is inputted to the CLK terminal of the D-FF 54. The CLR terminals of the D-FF's 53, 54 are set to an inactive state (High level) and the aforementioned CLR-A signal (shown in FIG. 15) is entered to the PRE terminals of the D-FF's 53, 54.

Comprising three D-FF's 55–57, a NAND circuit 58 and an AND circuit 59, the second count control circuit 23B has the same circuit construction as a combination of the circuit for detecting a rising edge of the data signal DT and the second hold circuit HD2 for holding a state representing detection of the rising edge, both contained in the data signal pulse edge detector 19 shown in FIG. 8. Specifically, the D-FF's 55, 56 and 57 correspond respectively to the D-FF's 27, 28 and 30 of FIG. 8 while the NAND circuit 58 and AND circuit 59 correspond respectively to the NAND circuit 32 and AND circuit 34 of FIG. 8.

The earlier mentioned UP signal is entered to the D terminal of the D-FF 55 and the reference clock RCLK is entered to the CLK terminals of the D-FF's 55–57. Inputted to the PRE terminal of the D-FF 57 is a CLR-B signal shown in FIG. 15.

The inverted-Q output (hereinafter referred to as an ST1 signal) of the D-FF 54 and the inverted-Q output (hereinafter referred to as an ST2 signal) of the D-FF 57 are entered to an OR circuit 60. The OR circuit 60 then outputs the earlier mentioned STON signal for determining a time period during which the sampling clock SCLK is generated. Individual pulses of the sampling clock SCLK are counted while the STON signal is kept at a High level.

Referring to FIG. 15, the character data end detector 24 comprises a binary counter 61 for counting individual pulses of the sampling clock SCLK, a first detector 24A for detecting the count value "9" of the binary counter 61, a second detector 24B for detecting the count value "7" of the binary counter 61 and a control signal output circuit 24C for outputting detect signals produced by the first and second detectors 24A, 24B as count stop control signals CLR-A and CLR-B, respectively.

The binary counter 61 is of the same type as the 4-bit binary counters 36–39 of the transmission rate detector 20. The first detector 24A comprises two inverters 64, 65 and a NAND circuit 62 while the second detector 24B comprises an inverter 66 and a NAND circuit 63. The control signal output circuit 24C comprises two OR circuits 67, 68.

The LOAD and ENT terminals of the binary counter 61 are set to a High level. The STON signal is entered to the ENP terminal of the binary counter 61 while the sampling clock SCLK is entered to its CLK terminal.

The QA to QD outputs of the binary counter 61 are entered to the NAND circuit 62 of the first detector 24A. Among them, the QA and QD outputs are directly fed to the NAND circuit 62 while the QB and QC outputs are reversed in polarity by the inverters 64, 65 before entering the NAND circuit 62.

The QA to QD outputs of the binary counter 61 are also delivered to the NAND circuit 63 of the second detector 24B. The QA to QC outputs are directly fed to the NAND circuit 63 while the QD output is reversed in polarity by the inverters 66 before entering the NAND circuit 63.

The RESET signal is entered to one input of the OR circuit 67 and the output of the NAND circuit 62 is entered to the other input of the OR circuit 67. Similarly, the RESET signal is entered to one input of the OR circuit 68 and the output of the NAND circuit 63 is entered to the other input of the OR circuit 68.

According the above-described circuit configuration, when a TRIG signal is entered to the AND circuit 52 of the count range setter 23, the TRIG signal is fed to the D terminal of the D-FF 53 so that the Q output (i.e., the CONTROL signal) of the D-FF 53 is switched to a Low level. In other words, the Low-level CONTROL signal is outputted at the falling edge of a start bit ST of the data signal DT as will be noted from FIG. 16. Since this Low-level Q output is fed back to the D terminal of the D-FF 53 via the AND circuit 52, the CONTROL signal outputted from the Q terminal of the D-FF 53 is maintained at a Low level until the CLR-A signal is entered to the first count control circuit 23A (or until a stop bit SP is detected).

When the Q output of the D-FF 53 is switched from High level to Low level, the D input (Low level) is latched by the D-FF 54 at a rising edge of the sampling clock SCLK. Consequently the ST1 signal outputted from the inverted-Q terminal of the D-FF 54 is switched from Low level to High level, and this High-level state is maintained until the CLR-A signal is entered. This means that a High-level ST1signal is outputted at the first rising edge (point ③ in FIG. 16) of the sampling clock SCLK.

On the other hand, when the UP signal changes from Low level to High level, the rising edge of the UP signal is detected by the D-FF's 54, 56 and NAND circuit 58 and a Low-level pulse signal is outputted by the NAND circuit 58. Also, when the NAND circuit 58 outputs this pulse signal, the inverted-Q output (i.e., the ST2 signal) of the D-FF 57 is switched from High level to Low level, and this Low-level state is maintained until it is reset by the CLR-B signal. This means that the ST2 signal is outputted at the falling edge (point ① in FIG. 16) of the start bit ST of the first character "A".

According to the above arrangement, when the first character "A" is received, the STON signal changes from Low level to High level at the falling edge (point ① in FIG. 16) of the start bit ST, and when the second or any other succeeding character is received, the STON signal changes from Low level to High level at the first rising edge (point ⑦ in FIG. 16) of the sampling clock SCLK. Therefore, the sampling clock SCLK is counted from its first pulse when the first character "A" is received while the sampling clock SCLK is counted from its second pulse (omitting the first pulse) when the second or any other succeeding character is received.

When a High-level STON signal is entered to the character data end detector 24, the binary counter 61 starts to count individual pulses of the sampling clock SCLK. When the count becomes "9", the binary counter 61 outputs a 4-bit signal "1001" from its QA to QD terminals. As the values of the QB and QC outputs are changed to "1" by the inverters 64 and 65, a 4-bit signal "1111" is entered to the NAND circuit 62. and the NAND circuit 62 outputs a High-level signal. This High-level signal is transmitted via the OR circuit 67 as a count stop control signal CLR-A. The count stop control signal CLR-A is entered to the CLR terminal of the binary counter 61, the CLR terminals of the binary counters 45–48 of the sampling clock generator 22 and the PRE terminals of the PRE terminals of the D-FF's 53, 54 of the count range setter 23. Therefore, the ST1 signal is reset to a Low level when the start bit ST of each character is detected.

When the number of pulses of the sampling clock SCLK counted by the binary counter 61 becomes "7", the binary counter 61 outputs a 4-bit signal "0111" from its QA to QD terminals. As the value of the QD output is changed to "1" by the inverter 66, a 4-bit signal "1111" is entered to the NAND circuit 63, and the NAND circuit 63 outputs a High-level signal. This High-level signal is transmitted via the OR circuit 68 as a count stop control signal CLR-B, which is then entered to the PRE terminal of the D-FF 57 of the count range setter 23.

When a RESET signal is entered to the character data end detector 24, it is also outputted as count stop control signals CLR-A, CLR-B.

The count stop control signal CLR-B is produced for shifting the sampling clock pulse count start timing for the second and succeeding characters from that for the first character "A".

The sampling clock SCLK is generated from the rising edge of the start bit ST (or the start point of the second bit b1, ① in FIG. 16) for the first character "A" while it is generated from the falling edge of the start bit ST (point ⑥ in FIG. 16) for the second and succeeding characters.

As a result, the first pulse of the sampling clock SCLK coincides with the start bit ST when receiving the second or any other succeeding character, however, the first pulse of the sampling clock SCLK coincides with the second bit b1. and not the start bit ST, when receiving the first character "A", as shown in FIG. 16.

Accordingly the present embodiment is constructed to allow detection of the start bit ST by counting 9 pulses of the sampling clock SCLK, where the pulse count operation is started from the first pulse of the sampling clock SCLK for the first character "A", from the second pulse of the sampling clock SCLK for the second and succeeding characters.

The CLR-B signal is a control signal for terminating a condition, in which the pulse count operation begins from the first pulse of the sampling clock SCLK, when all data elements of the first character "A" have been read. The CLR-B signal therefore causes the pulse count operation to start from the second pulse of the sampling clock SCLK when the second and succeeding characters are received.

More particularly, the CLR-B signal is outputted while the first character "A" is read. After the ST2 signal is reset to a Low level, the UP signal which sets the ST2 signal to a High level is not entered to the second count control circuit 23B as will be noted from FIG. 16. The STON signal which controls time periods during which the number of pulses of the sampling clock SCLK is counted becomes substantially same as the ST1 signal for the second and succeeding characters. It follows that treatment for starting the pulse count operation from the first pulse of the sampling clock SCLK is not applied to the second and succeeding characters.

Now, a control procedure for reception of transmitted characters is briefly explained with reference to the flowchart of FIG. 16.

When a data signal for the character "A" is entered to the data signal pulse edge detector 19, it detects the falling edge (point ①) of the start bit ST of the character "A" and outputs a TRIG signal. At this point, the UP signal is switched from Low level to High level. The rising edge (point ②) of the start bit ST of the character "A" is detected in succession and the DOWN signal is switched from High level to Low level.

When the UP signal is inverted to a High level, the STON signal outputted from the count range setter 23 is also inverted to a High level so that it becomes possible to count individual pulses of the sampling clock SCLK.

The transmission rate detector 20 determines the bit length τ (i.e., the time interval between points ① and ②) of the start bit ST from the ENP signal which is produced from the UP and DOWN signals. The data transmission rate Ni is determined from the number (or count C) of reference clock pulses occurring within the duration of the start bit ST. The sampling clock selector 21 outputs the clock select signal CS at the falling edge (point ②) of the DOWN signal and the sampling clock generator 22 produces a sampling clock SCLK having a specified frequency.

When the sampling clock SCLK is produced, the character data end detector 24 starts to count individual pulses of the sampling clock SCLK. Since the STON signal is set to a High level before the sampling clock SCLK is generated, the sampling clock SCLK is counted from its first pulse.

When the seventh pulse of the sampling clock SCLK is counted, the character data end detector 24 outputs the CLR-B signal at the falling edge (point ④) of the last information bit of the character "A", causing the ST2 signal to become Low. When the ninth pulse of the sampling clock SCLK is counted, it is judged that the stop bit SP of the character "A" has been detected (or complete data elements of the character "A" have been received). The character data end detector 24 then outputs a CLR-A signal at the rising edge (point ①) of the ninth sampling clock pulse, causing the CONTROL signal to be inverted to a High level so that generation of the sampling clock SCLK is terminated. When a data signal for the next character "T" is entered to the data signal pulse edge detector 19, the CONTROL signal is inverted to a Low level at the falling edge (point ①) of the start bit ST of the character "T" and the sampling clock SCLK is generated. The STON signal is inverted to a High level at the rising edge (point ⑦) of the first pulse of the sampling clock SCLK, from where the sampling clock pulse count operation begins. Since the STON signal becomes High at the first pulse of the sampling clock SCLK, the sampling clock SCLK is counted from its second pulse (omitting the first pulse). When the ninth pulse of the sampling clock SCLK is counted, it is judged that the stop bit SP of the character "T" has been detected (or complete data elements of the character "T" have been received). The character data end detector 24 then outputs a CLR-A signal at the rising edge (point ⑧) of the ninth sampling clock pulse. causing the CONTROL signal to be inverted to a High level so that generation of the sampling clock SCLK is terminated.

Reception of the third and succeeding characters takes the same sequence as used for reception of the second character "T", based on the same timing and signal patterns as described above. The sampling clock SCLK is generated at the falling edge of the start bit ST of a received character and the sampling clock SCLK is counted from its second pulse. When the ninth pulse of the sampling clock SCLK is counted, it is judged that the stop bit SP of the character has been detected and generation of the sampling clock SCLK is terminated.

As seen above. generation of the sampling clock SCLK is terminated upon detecting the stop bit SP of each character and the sampling clock SCLK is regenerated starting at the falling edge of the start bit ST of a succeeding character. According to this construction successive pulses of the sampling clock SCLK are exactly synchronized with individual bits of each character received so that it is possible to receive character data elements in a reliable manner.

The sampling clock SCLK is counted from its first pulse when the first character "A" is received while the sampling clock SCLK is counted from its second pulse when the second or any other succeeding character is received. The character data end detector 24 counts (n−1) pulses (9 pulses in this embodiment) of the sampling clock SCLK regardless of whether the current character is the first character "A" in order to detect the stop bit SP of the character, where "n" is the number of bits constituting each character. With this arrangement, it is possible to simplify the construction of a sampling clock counting circuit contained in the character data end detector 24.

Returning to FIG. 3, the overrun error detector 25 is a circuit for detecting an overrun error that occurs when data elements of one character are entered to the shift register 16 before the data latch circuit 17 latches (or reads out) data elements of a preceding character which have been stored in the shift register 16 resulting in a failure to receive the preceding character.

In the event of an overrun error, the overrun error detector 25 outputs an overrun signal (or sets an overrun flag) only for the character of which data has been affected by the overrun error.

Figure 17:
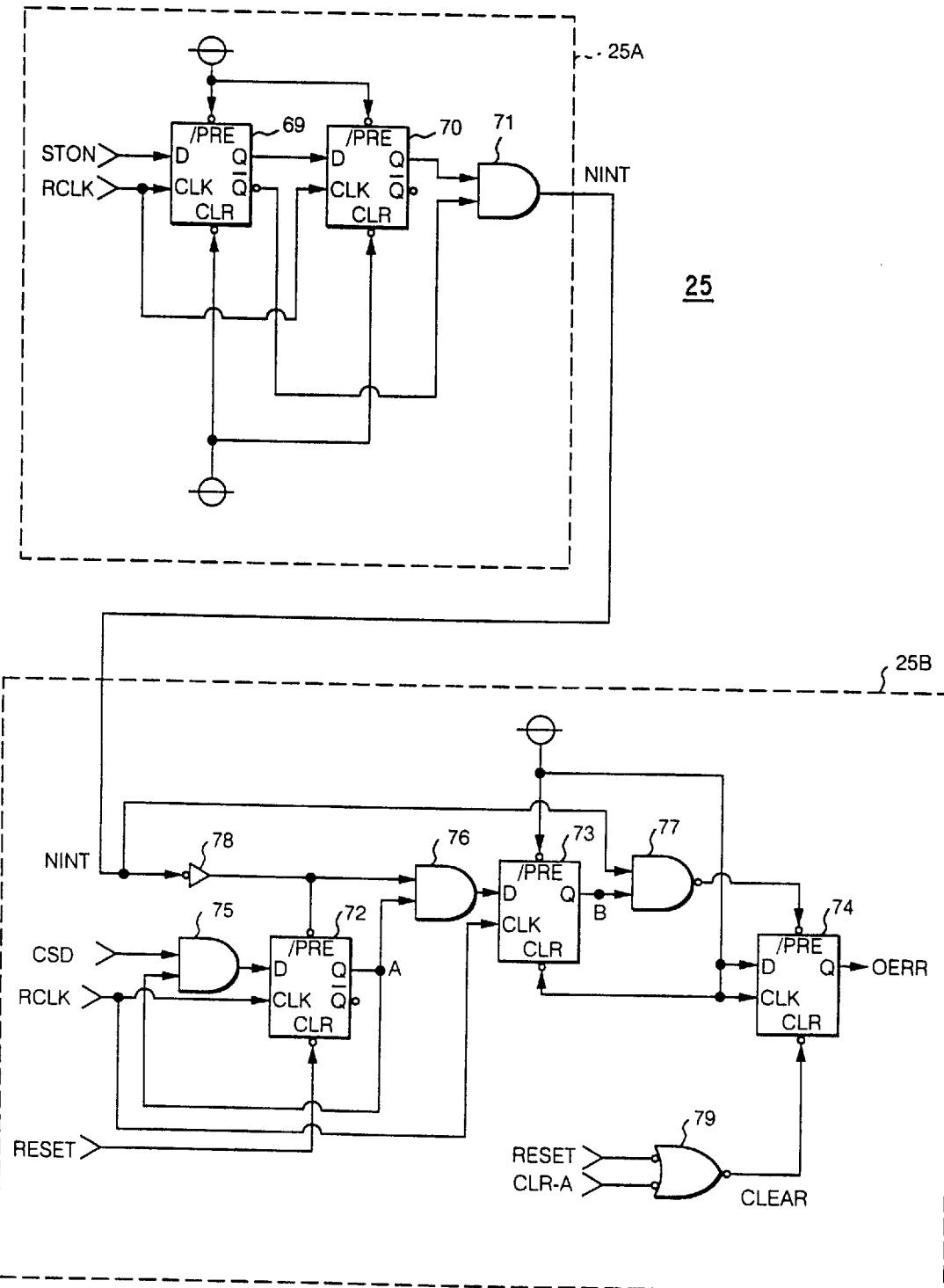
FIG. 17 is a circuit diagram of an overrun error detector.

FIG. 17 is a circuit diagram of the overrun error detector 25 according to the invention.

The overrun error detector 25 comprises a character end point detector 25A for detecting the end point of a character and an overrun detector 25B for detecting an overrun error.

The character end point detector 25A comprises a pair of D-FF's 69, 70 connected in cascade and an AND circuit 71 which outputs a detect signal (hereinafter referred to as the NINT signal) when the end point of a character has been detected. The earlier mentioned STON signal is entered to the D terminal of the first-stage D-FF 69 and the Q output of the D-FF 69 is fed into the D terminal of the second-stage D-FF 70. Also, the reference clock RCLK is entered to the CLK terminals of the two D-FF's 69, 70 and the inverted-Q output of the D-FF 69 and the Q output of the D-FF 70 are entered to the AND circuit 71. The CLR and PRE terminals of the D-FF's 69, 70 are set to an inactive state (High level).

The overrun detector 25B comprises three D-FF's 72–74, two AND circuits 75, 76, a NAND circuit 77, an inverter 78 and an OR circuit 79. When an overrun error has been detected, the D-FF 74 outputs an overrun detect signal OERR from its Q terminal.

The AND circuit 75 outputs a logical product of the data read signal CSD and the Q output (hereinafter referred to as the A signal) of the D-FF 72, and the output signal of the AND circuit 75 is entered to the D terminal of the D-FF 72. The AND circuit 76 outputs a logical product of the A signal and the NINT signal inverted by the inverter 78, and the output signal of the AND circuit 76 is entered to the D terminal of the D-FF 73. The reference clock RCLK is entered to the CLK terminals of the D-FF's 72, 73 and the inverted NINT signal is also fed into the PRE terminal of the AND circuit 71. The earlier mentioned RESET signal is entered to the CLR terminal of the D-FF 72. The CLR and PRE terminals of the D-FF 73 are set to an inactive state (High level).

Further, the NAND circuit 77 outputs a logical product of the NINT signal and the Q output (hereinafter referred to as the B signal) of the D-FF 73. The output signal (hereinafter referred to as the SET signal) of the NAND circuit 77 is entered to the PRE terminal of the D-FF 74. Also, the OR circuit 79 outputs a logical sum of the RESET signal and the CLR-A signal. The output signal (hereinafter referred to as the CLEAR signal) of the OR circuit 79 is entered to the CLR terminal of the D-FF 74.

The SET signal is a control signal for producing the overrun detect signal OERR by which an overrun flag is set and the CLEAR signal is a control signal for canceling the overrun detect signal OERR by which the overrun flag is reset. The D terminal and CLK terminal of the D-FF 74 are set to an inactive state (High level).

Figure 18:
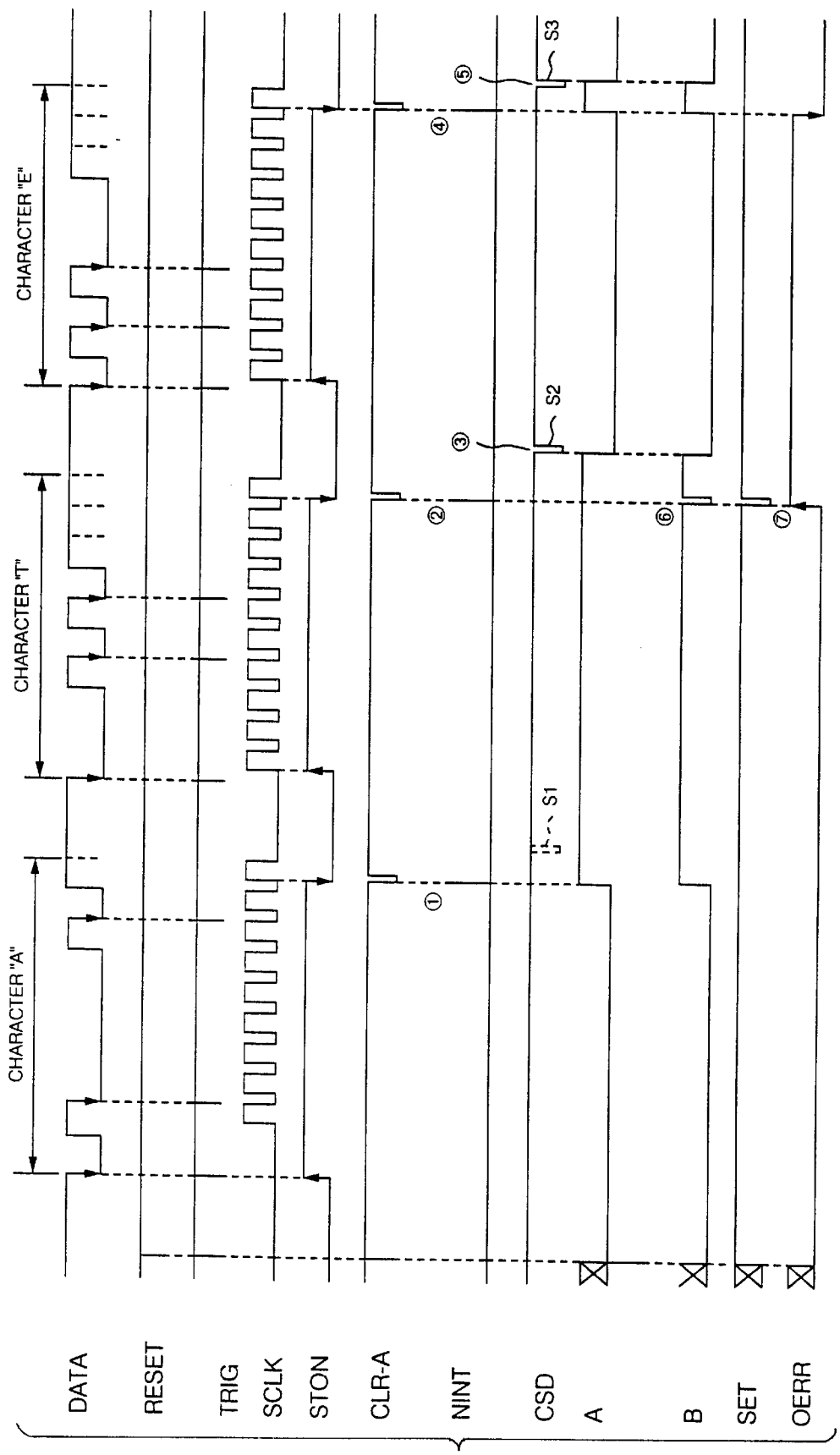
FIG. 18 is a time chart showing operation of the overrun error detector.

Referring now the time chart of FIG. 18. operation of the overrun error detector 25 is described.

FIG. 18 is a time chart showing waveforms of the STON signal, NINT signal, CSD signal, SET signal, OERR signal and other signals that will appear when an overrun error occurs in receiving successively transmitted characters "A", "T" and "E".

If the characters "A", "T" and "E" are properly received, the control block 6 outputs the CSD signal within the time interval between two successive characters. In FIG. 18, however, the data read signal CSD is not outputted within the time interval between the characters "A" and "T" (S1 in FIG. 18). As a result, an overrun is caused by the character "T" as data elements of the character "A" have not been read out.

When the stop bit SP of the first character "A" is detected, the STON signal changes from High level to Low level and the character end point detector 25A outputs a High-level pulse, or the NINT signal, at the falling edge of the STON signal (point ① in FIG. 18). The NINT signal is also outputted when the stop bits SP of the characters "T". "E" and so on are detected (points ② and ③ in FIG. 18).

When the NINT signal is outputted, an inverted NINT signal is entered to the PRE terminal of the D-FF 72 so that its Q output is set to a High level. Since the data read signal CSD is not entered (or the data read signal CSD is set to a High level) at this point, the output of the AND circuit 75 which is entered to the D terminal of the D-FF 72 becomes High so that the Q output of the D-FF 72 is maintained at a High level.

When the data read signal CSD is inputted for reading data of the second character "T" (point ③ in FIG. 18), the Q output of the D-FF 72 is switched to a Low level. Subsequently. the A signal is successively inverted when the stop bit SP of the third character "E" is detected and when the data read signal CSD is entered (points ④ and ⑤ in FIG. 18).

After the Q output of the D-FF 72 is inverted to a High level when the stop bit SP of the character "A" is detected, the output of the AND circuit 76 which is entered to the D terminal of the D-FF 73 switches from a Low level to a High level at the falling edge of the NINT signal. The Q output (or the B signal) of the D-FF 73 then switches from a Low level to a High level.

The output of the AND circuit 76 is inverted to a Low level when the Q output of the D-FF 72 becomes Low or when the NINT signal is outputted. Therefore, the Q output of the D-FF 73 set to a High level as explained above momentarily becomes Low when the stop bit SP of the second character "T" is detected (point ⑦ in FIG. 18). When the data read signal CSD is inputted for reading data of the second character "T", the Q output of the D-FF 73 is inverted again to a Low level. Subsequently, the B signal is successively inverted like the A signal when the stop bit SP of the third character "E" is detected and when the data read signal CSD is entered.

Since the SET signal is a logical product of the above-mentioned B signal and NINT signal, it is outputted at the same time as the NINT signal is outputted only when the stop bit SP of the second character "T" has been detected. The SET signal causes to the Q output of the D-FF 74 (or the overrun detect signal OERR) to be set to a High level (point ⑦ in FIG. 18).

When the stop bit SP of the third character "E" is detected, the CLR-A signal is entered to the CLR terminal of the D-FF 74 via the OR circuit 79. Therefore, the overrun detect signal OERR is reset to a Low level just when the stop bit SP of the third character "E" is detected (point ① in FIG. 18).

The data read signal CSD (S2 in FIG. 18) is not entered should it happen that the third character "E" also causes an overrun. In this case, the A signal is maintained at a High level until the data read signal CSD (S3 in FIG. 18) for the character "E" is entered. The B signal momentarily becomes Low when the stop bit SP of the second character "E" is detected. When the data read signal CSD for the character "E" is entered, the B signal is inverted again to a Low level.

Therefore, the overrun detect signal OERR is once reset to a Low level just when the stop bit SP of the character "E" is detected, and immediately set to a High level. It is reset to a Low level when the start bit ST of a fourth character is detected. This means that in the event of successive overruns, the overrun detect signal OERR is set to a High level when the stop bit SP of a character which causes the first overrun is detected, and reset to a Low level when the stop bit SP of a character immediately following a character which causes the last overrun is detected.

If data elements of one character are stored in the shift register 16 before the control block 6 reads out data elements of the preceding character from the shift register 16, it is judged that an overrun has occurred and an overrun flag is set when reception of the latter character is completed (or when its stop bit SP is detected). When a new character is received after data elements of a preceding character have been read out by the shift register 16, the overrun flag is automatically reset upon completing reception of the new character. This arrangement makes it easy to control flag set/reset operations.

Although the invention has been described with reference to the communications controller 10 provided in the facsimile machine 1, potential embodiments are not limited to applications in the facsimile machine 1. The invention is applicable to such communications terminals as a personal computer or a printer as well as data reception control devices like a modem.

What is claimed is:

1. A data reception control device for receiving a group of commands transmitted by a start-stop transmission method including a first type of commands of which data transmission rates are detectable and a second type of commands of which data transmission rates are undetectable, said data reception control device comprising:

data transmission rate determination means for determining a data transmission rate from a start bit length of a first character of a received command and generating a select signal identifying said data transmission rate;

clock generation means, responsive to said select signal, for generating a sampling clock for data bit synchronization in accordance with the data transmission rate obtained;

data reception means for receiving character data of the received command based on the sampling clock;

data element analyzing means for analyzing data elements of the received command;

judgment means for judging whether a next command is of a type having the same data transmission rate as the preceding command based on results of data element analysis;

data reception control means for controlling said data reception means such that character data of the next command is received by using a sampling clock corresponding to the data transmission rate of the preceding command if said judgment means judges that the next command is of the type having the same data transmission rate as the preceding command;

said data reception control means having means for inhibiting data transmission rate determination operation of said data transmission rate determination means when receiving the next command if said judgment means judges that the next command is of a type having the same data transmission rate as the preceding command, and maintaining the select signal outputted from said data rate determination means until reception of the next command is completed;

said data rate determination means including first detection means for detecting a leading edge of said start bit and generating a start count signal, second detection means for detecting a trailing edge of said start bit and generating a stop count signal, counting means for counting a number of pulses of said reference clock occurring between occurrences of said start count signal and said stop count signal, comparing means for comparing said number of pulses to predetermined ranges to generate said select signal identifying said data transmission rate wherein said first detection means, said second detection means and said counting means are enabled for one-shot operation by a reset signal from said data reception control means being set to a reset state;

said means for inhibiting data rate determination operation of said data reception control means including means for maintaining said reset signal in a non-reset state if said judgment means judges that the next command is of the type having the same data transmission rate as the preceding command; and said data reception control means including means for setting said reset signal to a reset state when said judgment means does not determine that the next command is of the type having the same data transmission rate as the preceding command.

2. A data reception control device for receiving a group of commands transmitted by a start-stop transmission method including a first type of commands of which data transmission rates are detectable and a second type of commands of which data transmission rates are undetectable, said data reception control device comprising:

data transmission rate determination means for determining a data transmission rate from a start bit length of a first character of a received command and a set of predetermined transmission rates and generating a select signal identifying said data transmission rate;

clock generation means, responsive to said select signal, for generating a sampling clock for data bit synchronization in accordance with the data transmission rate obtained wherein said clock generation means simultaneously generates clock frequencies corresponding to said set of predetermined transmission rates by dividing a reference clock;

data reception means for receiving character data of the received command based on the sampling clock;

data element analyzing means for analyzing data elements of the received command;

judgment means for judging whether a next command is of a type having the same data transmission rate as the preceding command based on results of data element analysis;

data reception control means for controlling said data reception means such that character data of the next command is received by using a sampling clock corresponding to the data transmission rate of the preceding command if said judgment means judges that the next command is of the type having the same data transmission rate as the preceding command; and said data reception control means having means for inhibiting data transmission rate determination operation of said data transmission rate determination means when receiving the next command if said judgment means judges that the next command is of a type having the same data transmission rate as the preceding command, and maintaining the select signal outputted from said data rate determination means until reception of the next command is completed.

3. The data reception device according to claim 2 wherein:

said data rate determination means includes first detection means for detecting a leading edge of said start bit and generating a start count signal, second detection means for detecting a trailing edge of said start bit and generating a stop count signal, counting means for counting a number of pulses of said reference clock occurring between occurrences of said start count signal and said stop count signal, comparing means for comparing said number of pulses to predetermined ranges to generate said select signal identifying said data transmission rate wherein said first detection means, said second detection means and said counting means are enabled for one-shot operation by a reset signal form said data reception control means being set to a reset state;

said means for inhibiting data rate determination operation of said data reception control means includes maintaining said reset signal in a nonreset state if said judgment means judges that the next command is of the type having the same data transmission rate as the preceding command; and said data reception control means includes means for setting said reset signal to a reset state when said judgment means does not determine that the next command is of the type having the same data transmission rate as the preceding command.

4. A data reception control device for receiving a group of commands transmitted by a start-stop transmission method including a first type of commands of which data transmission rates are detectable and a second type of commands of which data transmission rates are undetectable, said data reception control device comprising:

first detection means for detecting a leading edge of a start bit of a first character of a received command and generating a start count signal;

second detection means for detecting a trailing edge of said start bit and generating a stop count signal;

counting means for counting a number of pulses of a reference clock occurring between occurrences of said start count signal and said stop count signal;

comparing means for comparing said number of pulses to predetermined ranges to generate a select signal identifying a data transmission rate selected from a set of predetermined transmission rates corresponding respectively to said predetermined ranges;

said first detection means, said second detection means and said counting means being enabled for one-shot operation by a reset signal from said data reception control means being set to a reset state;

clock generation means, responsive to said select signal, for generating a sampling clock for data bit synchronization in accordance with the data transmission rate identified;

data reception means for receiving character data of the received command based on the sampling clock;

data element analyzing means for analyzing data elements of the received command;

judgment means for judging whether a next command is of a type having a same data transmission rate as the preceding command by comparing results of data element analysis with a predetermined list of commands;

means for inhibiting data rate identification by said comparing means by maintaining said reset signal in a non-reset state if said judgment means judges that the next command is of the type having the same data transmission rate as the preceding command; and means for setting said reset signal to a reset state when said judgment means does not determine that the next command is of the type having the same data transmission rate as the preceding command.

5. The data reception device according to claim 4, wherein said clock generation means simultaneously generates clock frequencies corresponding to said set of predetermined transmission rates by dividing a reference clock.

* * * * *